United States Patent
Nishimura et al.

(10) Patent No.: US 9,699,622 B1
(45) Date of Patent: *Jul. 4, 2017

(54) MANAGEMENT OF DYNAMIC EVENTS AND MOVING OBJECTS

(71) Applicant: International Business Machines Corporation, Armonk, NY (US)

(72) Inventors: Yasutaka Nishimura, Yamato (JP); Hiroya Ogihara, Kawasaki (JP); Takahito Tashiro, Mitaka (JP); Shoichiro Watanabe, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/254,183

(22) Filed: Sep. 1, 2016

Related U.S. Application Data

(63) Continuation of application No. 14/970,600, filed on Dec. 16, 2015, now Pat. No. 9,467,839.

(51) Int. Cl.
*H04W 4/22* (2009.01)
*H04W 4/02* (2009.01)
(Continued)

(52) U.S. Cl.
CPC ...... *H04W 4/046* (2013.01); *G06F 17/30241* (2013.01); *H04L 12/1845* (2013.01);
(Continued)

(58) Field of Classification Search
None
See application file for complete search history.

(56) References Cited

U.S. PATENT DOCUMENTS

| 5,948,040 A | 9/1999 | Delorme et al. |
| 6,028,550 A | 2/2000 | Froeberg et al. |

(Continued)

FOREIGN PATENT DOCUMENTS

| CN | 102147260 A | 8/2011 |
| CN | 102231231 A | 11/2011 |

(Continued)

OTHER PUBLICATIONS

IBM, "List of IBM Patents or Patent Applications Treated as Related (Appendix P)," Sep. 20, 2016, p. 1-2.
(Continued)

*Primary Examiner* — Russell Frejd
(74) *Attorney, Agent, or Firm* — Erik K. Johnson

(57) ABSTRACT

An embodiment of the invention includes a system, method and computer program product for managing dynamic events. The embodiment may include managing, by a first subsystem, an event in a first region of the plurality of geographic regions using a first event agent. The embodiment may include determining whether the event is predicted to spread from the first region to a second region. The embodiment may include generating a first dynamic event agent to monitor the event as a dynamic event based on predicting the event may spread from the first region to the second region. The first dynamic event agent may receive information relating to the dynamic event, update a status of the dynamic event based on the received information, and transmit the received information. The embodiment may include generating, by a second subsystem, a second dynamic event agent for handling the dynamic event in the second region.

18 Claims, 28 Drawing Sheets

(51) Int. Cl.
*H04W 4/04* (2009.01)
*H04W 76/00* (2009.01)
*G06F 17/30* (2006.01)
*H04L 12/18* (2006.01)
*H04L 29/08* (2006.01)

(52) U.S. Cl.
CPC ............. *H04W 4/02* (2013.01); *H04W 4/021* (2013.01); *H04W 4/04* (2013.01); *H04W 4/22* (2013.01); *H04W 76/007* (2013.01); *H04L 67/12* (2013.01)

(56) References Cited

U.S. PATENT DOCUMENTS

| | | | |
|---|---|---|---|
| 6,150,961 A | 11/2000 | Alewine et al. | |
| 6,556,825 B1 | 4/2003 | Mansfield | |
| 7,395,151 B2 | 7/2008 | O'Neill et al. | |
| 7,447,588 B1 | 11/2008 | Xu et al. | |
| 7,525,933 B1 | 4/2009 | Hall | |
| 7,657,406 B2 | 2/2010 | Tolone et al. | |
| 7,689,348 B2 | 3/2010 | Boss et al. | |
| 7,710,421 B2 | 5/2010 | Muramatsu | |
| 7,899,611 B2 | 3/2011 | Downs et al. | |
| 7,979,172 B2 | 7/2011 | Breed | |
| 8,000,887 B2 | 8/2011 | Nathan et al. | |
| 8,064,378 B2 | 11/2011 | Karabinis | |
| 8,195,436 B2 | 6/2012 | Tolone et al. | |
| 8,374,777 B2 | 2/2013 | Reich | |
| 8,396,652 B2 | 3/2013 | Nomura | |
| 8,428,876 B2 | 4/2013 | Lee | |
| 8,473,263 B2 | 6/2013 | Tolone et al. | |
| 8,510,319 B2 | 8/2013 | Stevens | |
| 8,599,848 B2 | 12/2013 | Janneteau et al. | |
| 8,620,510 B1 | 12/2013 | Meuth et al. | |
| 8,768,012 B2 | 7/2014 | Satoh | |
| 8,799,246 B2 | 8/2014 | Nomura et al. | |
| 8,818,608 B2 | 8/2014 | Cullinane et al. | |
| 8,850,013 B2 | 9/2014 | Waldman et al. | |
| 8,862,146 B2 | 10/2014 | Shatsky et al. | |
| 8,930,269 B2 | 1/2015 | He et al. | |
| 8,988,252 B2 | 3/2015 | Scholl et al. | |
| 9,113,293 B1 | 8/2015 | Rayburn et al. | |
| 9,210,589 B2 | 12/2015 | Panta et al. | |
| 9,237,417 B2 | 1/2016 | Marshall et al. | |
| 2004/0172316 A1 | 9/2004 | Hale et al. | |
| 2004/0230370 A1 | 11/2004 | Tzamaloukas | |
| 2005/0065711 A1 | 3/2005 | Dahlgren et al. | |
| 2007/0109303 A1 | 5/2007 | Muramatsu | |
| 2007/0241932 A1 | 10/2007 | Otero et al. | |
| 2008/0046134 A1 | 2/2008 | Bruce et al. | |
| 2009/0070024 A1 | 3/2009 | Burchard et al. | |
| 2009/0248758 A1 | 10/2009 | Sawai et al. | |
| 2009/0287405 A1 | 11/2009 | Liu et al. | |
| 2009/0311986 A1 | 12/2009 | Bose et al. | |
| 2009/0327918 A1 | 12/2009 | Aaron et al. | |
| 2010/0036595 A1 | 2/2010 | Coy et al. | |
| 2010/0188265 A1 | 7/2010 | Hill et al. | |
| 2010/0199213 A1 | 8/2010 | Suzuki | |
| 2011/0037619 A1 | 2/2011 | Ginsberg et al. | |
| 2011/0103302 A1 | 5/2011 | Hall | |
| 2011/0205040 A1 | 8/2011 | Van Wiemeersch et al. | |
| 2011/0276692 A1 | 11/2011 | Waldman et al. | |
| 2012/0092187 A1 | 4/2012 | Scholl et al. | |
| 2012/0291049 A1 | 11/2012 | Park et al. | |
| 2013/0006925 A1 | 1/2013 | Sawai et al. | |
| 2013/0099941 A1 | 4/2013 | Jana et al. | |
| 2013/0204524 A1 | 8/2013 | Fryer et al. | |
| 2013/0214939 A1 | 8/2013 | Washlow et al. | |
| 2013/0244564 A1 | 9/2013 | Hall | |
| 2013/0321397 A1 | 12/2013 | Chen et al. | |
| 2014/0025432 A1 | 1/2014 | Thomassen et al. | |
| 2014/0120953 A1 | 5/2014 | Ingram et al. | |
| 2014/0136099 A1 | 5/2014 | Choi et al. | |
| 2014/0180773 A1 | 6/2014 | Zafiroglu et al. | |
| 2014/0191858 A1 | 7/2014 | Morgan et al. | |
| 2014/0195214 A1 | 7/2014 | Kozloski et al. | |
| 2014/0236414 A1 | 8/2014 | Droz et al. | |
| 2014/0248899 A1 | 9/2014 | Emadzadeh et al. | |
| 2014/0278026 A1 | 9/2014 | Taylor | |
| 2014/0278029 A1 | 9/2014 | Tonguz et al. | |
| 2014/0289267 A1 | 9/2014 | Felix et al. | |
| 2014/0370842 A1 | 12/2014 | Abtin et al. | |
| 2014/0378090 A1 | 12/2014 | Hall | |
| 2015/0039391 A1 | 2/2015 | Hershkovitz et al. | |
| 2015/0051822 A1 | 2/2015 | Joglekar | |
| 2015/0066284 A1 | 3/2015 | Yopp | |
| 2015/0120083 A1 | 4/2015 | Gurovich et al. | |
| 2015/0149019 A1 | 5/2015 | Pilutti et al. | |
| 2015/0179077 A1 | 6/2015 | Morgan et al. | |

FOREIGN PATENT DOCUMENTS

| | | |
|---|---|---|
| CN | 102997928 A | 3/2013 |
| CN | 103247176 A | 8/2013 |
| CN | 103258043 A | 8/2013 |
| CN | 103971529 A | 8/2014 |
| DE | 10030819 A1 | 1/2002 |
| DE | 102005020154 A1 | 11/2006 |
| EP | 1914701 A2 | 4/2008 |
| JP | 11083511 A | 3/1999 |
| JP | 2001028004 A | 1/2001 |
| JP | 2007286706 A | 11/2007 |
| JP | 2008123197 A | 5/2008 |
| JP | 2008123325 A | 5/2008 |
| JP | 2008262418 A | 10/2008 |
| JP | 2008294921 A | 12/2008 |
| JP | 2009277078 A | 11/2009 |
| JP | 2011158339 A | 8/2011 |
| JP | 4985119 B2 | 7/2012 |
| JP | 2012150515 A | 8/2012 |
| JP | 2012155286 A | 8/2012 |
| JP | 2013045242 A | 3/2013 |
| JP | 2013101119 A | 5/2013 |
| JP | 2013101120 A | 5/2013 |
| JP | 2014065362 A | 4/2014 |
| JP | 2014075008 A | 4/2014 |
| JP | 2014095663 A | 5/2014 |
| JP | 2015018396 A | 1/2015 |
| JP | 2015081057 A | 4/2015 |
| KR | 101354607 B1 | 1/2014 |
| WO | 2007140527 A1 | 12/2007 |
| WO | 2011081157 A1 | 7/2011 |
| WO | 2012167174 A1 | 12/2012 |
| WO | 2013167085 A2 | 11/2013 |

OTHER PUBLICATIONS

Abrougui et al., "Efficient load balancing and QoS-based location aware service discovery protocol for vehicular ad hoc networks," EURASIP Journal on Wireless Communications and Networking, Mar. 2012, p. 1-15, Springer.

Aulinas et al., "Local map update for large scale SLAM," Electronics Letters, Apr. 15, 2010, p. 1-2, vol. 46, No. 8.

Dangel et al., "Can Road Traffic Volume Information Improve Partitioning for Distributed SUMO?," Modeling Mobility with Open Data, Lecture Notes in Mobility, 2015, p. 61-74, Springer International Publishing.

DRM, "Local Dynamic Map," DRM Research Seminar, Jun. 30, 2010, p. 1-72, Japan Digital Road Map Association.

Hong et al., "A grid-based node split algorithm for managing current location data of moving objects," The Journal of Supercomputing, Dec. 2007, p. 321-337, vol. 42, Issue 3, Springer.

Hsu et al., "Automatic Traffic Monitoring Method Based on Cellular Model," Fifth International Conference on Intelligent Information Hiding and Multimedia Signal Processing, 2009, p. 640-643, IEEE Computer Society.

Ihm et al., "Advanced Spatial Data Management for Enterprise Applications," An Oracle White Paper, Aug. 2010, p. 1-16, Oracle Spatial 11g.

(56) References Cited

OTHER PUBLICATIONS

Openstreetmap, "QuadTiles," OpenStreetMap Wiki, Last Modified on Mar. 3, 2014, p. 1-10, http://wiki.openstreetmap.org/wiki/QuadTiles, Accessed on Jun. 15, 2015.

Ortelli, "Server-side clustering of geo-points on a map using Elasticsearch," Trifork Blog, Aug. 1, 2013, p. 1-14, http://blog.trifork.com/2013/08/01/server-side-clustering-of-geo-points-on-a-map-using-elasticsearch/, Accessed on Jun. 15, 2015.

Pawlowski et al., "Applying Event Stream Processing on Traffic Problem Detection," Progress in Artificial Intelligence (EPAI), 2009, p. 27-38, LNAI vol. 5816, Springer-Verlag Berlin Heidelberg.

Schade, "Sharing Data by Means of a Local Dynamic Map," Understanding the Standards for Cooperative ITS, Feb. 6, 2014, p. 1-10, MINES ParisTech, Transportation Sustainability Environment Consulting.

Suzumura et al., "X10-based Massive Parallel Large-Scale Traffic Flow Simulation," ProVISION, Winter 2012, p. 74-79, No. 72, IBM Professionals' Papers.

Y et al., "A Complex Event Processing System Approach to Real Time Road Traffic Event Detection," Journal of Convergence Information Technology (JCIT), Oct. 2013, p. 142-148, vol. 8, No. 15.

Yang et al., "Spatio-temporal Coupled Bayesian Robust Principal Component Analysis for Road Traffic Event Detection," Proceedings of the 16th International IEEE Annual Conference on Intelligent Transportation Systems (ITSC 2013), Oct. 6-9, 2013, p. 392-398, IEEE, The Hague, The Netherlands.

Gotoh et al., "Geographic Space Management," Application and Drawings, filed Jun. 19, 2015, p. 1-97, U.S. Appl. No. 14/744,052.

Gotoh et al., "Geographic Space Management," Application and Drawings, filed Jun. 25, 2015, p. 1-95, U.S. Appl. No. 14/750,298.

Gotoh et al., "Geographic Space Management," Application and Drawings, filed Jun. 25, 2015, p. 1-95, U.S. Appl. No. 14/750,334.

Gotoh et al., "Geographic Space Management," Application and Drawings, filed Jul. 8, 2015, p. 1-93, U.S. Appl. No. 14/793,934.

Gotoh et al., "Geographic Space Management," Application and Drawings, filed Jun. 19, 2015, p. 1-95, U.S. Appl. No. 14/744,056.

Gotoh et al., "Geographic Space Management," Application and Drawings, filed Jul. 16, 2015, p. 1-92, U.S. Appl. No. 14/800,774.

Gotoh et al., "Geographic Space Management," Application and Drawings, filed Jul. 16, 2015, p. 1-92, U.S. Appl. No. 14/800,782.

Gotoh et al., "Geographic Space Management," Application and Drawings, filed Jun. 19, 2015, p. 1-94, U.S. Appl. No. 14/744,066.

Gotoh et al., "Geographic Space Management," Application and Drawings, filed Jul. 16, 2015, p. 1-91, U.S. Appl. No. 14/800,795.

Gotoh et al., "Geographic Space Management," Application and Drawings, filed Jul. 16, 2015, p. 1-91, U.S. Appl. No. 14/800,811.

Gotoh et al., "Geographic Space Management," Application and Drawings, filed Jun. 19, 2015, p. 1-93, U.S. Appl. No. 14/744,067.

Gotoh et al., "Geographic Space Management," Application and Drawings, filed Jul. 16, 2015, p. 1-91, U.S. Appl. No. 14/800,821.

Gotoh et al., "Geographic Space Management," Application and Drawings, filed Jul. 16, 2015, p. 1-91, U.S. Appl. No. 14/800,839.

Gotoh et al., "Management of Moving Objects," Application and Drawings, filed Jun. 19, 2015, p. 1-46, U.S. Appl. No. 14/744,071.

Gotoh et al., "Management of Moving Objects," Application and Drawings, filed Jul. 17, 2015, p. 1-46, U.S. Appl. No. 14/802,289.

Gotoh et al., "Management of Moving Objects," Application and Drawings, filed Jul. 17, 2015, p. 1-46, U.S. Appl. No. 14/802,316.

Yamamoto, "Management of Moving Objects," Application and Drawings, filed Jun. 19, 2015, p. 1-59, U.S. Appl. No. 14/744,074.

Yamamoto, "Management of Moving Objects," Application and Drawings, filed Jul. 17, 2015, p. 1-58, U.S. Appl. No. 14/802,343.

Yamamoto, "Management of Moving Objects," Application and Drawings, filed Jul. 17, 2015, p. 1-58, U.S. Appl. No. 14/802,361.

Gotoh et al., "Management of Events and Moving Objects," Application and Drawings, filed Jul. 7, 2015, p. 1-69, U.S. Appl. No. 14/792,805.

Gotoh et al., "Management of Events and Moving Objects," Application and Drawings, filed Jul. 16, 2015, p. 1-68, U.S. Appl. No. 14/801,014.

Gotoh et al., "Management of Events and Moving Objects," Application and Drawings, filed Jul. 16, 2015, p. 1-68, U.S. Appl. No. 14/801,054.

Miyahira et al., "Management of Mobile Objects and Service Platform for Mobile Objects," Application and Drawings, filed Dec. 16, 2015, p. 1-69, U.S. Appl. No. 14/970,596.

Nishimura et al., "Management of Dynamic Events and Moving Objects," Application and Drawings, filed Dec. 16, 2015, p. 1-92, U.S. Appl. No. 14/970,600.

Ishikawa et al., "Management of Evacuation With Mobile Objects," Application and Drawings, filed Dec. 16, 2015, p. 1-50, U.S. Appl. No. 14/970,609.

Gotoh et al., "Geographic Space Management," Application and Drawings, filed Dec. 16, 2015, p. 1-72, U.S. Appl. No. 14/970,616.

Ishikawa et al., "Management of Mobile Objects and Resources," Application and Drawings, filed Dec. 16, 2015, p. 1-52, U.S. Appl. No. 14/970,626.

Gotoh et al., "Management of Mobile Objects," Application and Drawings, filed Dec. 16, 2015, p. 1-65, U.S. Appl. No. 14/970,631.

Ishikawa et al., "Management of Mobile Objects," Application and Drawings, filed Dec. 16, 2015, p. 1-78, U.S. Appl. No. 14/970,643.

IEEE, "Server—Definition," IEEE 100: The Authoritative Dictionary of IEEE Standards Terms, 2000, p. 1031, Seventh Edition.

IEEE, "System—Definition," IEEE 100: The Authoritative Dictionary of IEEE Standards Terms, 2000, p. 1143-1144, Seventh Edition.

Gove et al., "NetVisia: Heat Map & Matrix Visualization of Dynamic Social Network Statistics & Content", 2011 IEEE International Conference on Privacy, Security, Risk, and Trust, and IEEE International Conference on Social Computing, Oct. 9-11, 2011, pp. 19-26.

| Edge ID | Event ID | Location | Event Content | Influence Event |
|---|---|---|---|---|
| Edge 0001 | Eve 0214 | Full Length | Speed Limited to 30km/h | Eve 0114(Edge 0002) |
| Edge 0002 | Eve 0114 | 32m from the 1st node | Closure | Eve 0214(Edge 0001), Eve 0421(Edge 0003)... |
| ⋯ | ⋯ | ⋯ | ⋯ | ⋯ |
| Edge 1000 | N/A | - | - | Eve 1201 (edge xxxx) |

Event List

*FIG. 9*

| Edge ID | Counts | Location | Event Content |
|---|---|---|---|
| Edge 0009 | 2 | Full length | Congestion |
| Edge 0013 | 1 | 15m from the 2nd node | Skid |
| ▬▬▬▬▬▬ | ▬▬▬▬▬ | ▬▬▬▬▬ | |

Candidate Event List

FIG. 10

| Edge ID | Event ID | Location | Event Content |
|---|---|---|---|
| Edge 0001 | Eve 0214 | Full Length | Speed Limited to 30km/h |
| Edge 0002 | Eve 0114 | 32m from the 1st node | Closure |

Notification Event List

*FIG. 11*

Dynamic Event Status

1451

| DYNAMIC EVENT: Hurricane | | | |
|---|---|---|---|
| DYNAMIC EVENT ID: D0001 | | | |
| Area ID | Edge ID | Location | Dynamic Event Content |
| Area 0001 | Edge 0001 | Full Length | Speed Limited to 30km/h |
| Area 0001 | Edge 0002 | 32m from the 1st node | Closure |
| ······ | ······ | ······ | ······ |

*FIG. 21*

| Local DEA | Dynamic Event ID | Dynamic Event | Local DEA Generation | Local Status | Source DEA | Source DEA Generation |
|---|---|---|---|---|---|---|
| DEA1A | D0001 | Hurricane | 2015-10-11-10:42 | Active | DEA1A | 2015-10-11-10:42 |
| DEA2A | D0002 | Collision | 2015-10-12-09:20 | Ended | DEA2B | 2015-10-12-09:15 |
| DEA3A | D0003 | Fire | 2015-10-12-10:30 | Ended | DEA3A | 2015-10-12-10:30 |
| ----- | ----- | ----- | ----- | ----- | ----- | ----- |

Local DEA Information

*FIG. 22*

DEA Registry

MANAGEMENT OF DYNAMIC EVENTS AND MOVING OBJECTS

BACKGROUND

The present invention relates to managing dynamic events and moving objects in a geographic space.

A driver assistance system communicates with automobiles and/or other apparatuses to collect information about roads, handles events occurring in a geographic space, and assists the automobiles to move in the geographic space. Since a driver assistance system manages a large number of automobiles and events in a geographic space, it has to process a great deal of information. Since cars generally move at high speed and require the latest information, it is desirable to complete all processes of a driving system within one server in order to minimize processing time for individual automobiles.

However, as the geographic space being handled by such a system expands, the amount of information being transmitted and received increases due to an increase in the number of automobiles and the number of roads, and the corresponding requirements might exceed the processing power of a single server. Even if the geographic space is divided and a plurality of servers are used to process the regions resulting from the division, automobiles move at high speeds between the plurality of regions, and therefore further communication between the servers is necessary, such that the communication load between servers increases. The increase of the communication load between the servers prevents the system from processing each automobile in a short time. Therefore, a system to enable less communication load between servers and higher scalability is further needed for efficiently managing large scale geographic spaces.

Moreover, when a large-scale event occurs, such as an accident or natural disaster that causes large-scale traffic congestion, a plurality of the regions may be affected. At the occurrence of such a large-scale event, vast amounts of associated events may be generated, causing system load to suffer a rapid increase. Therefore, a system for efficiently processing large-scale events that affect a plurality of regions is needed.

SUMMARY

An embodiment of the invention includes a system, method and computer program product for managing dynamic events. The embodiment may include managing, by a first subsystem, an event in a first region of the plurality of geographic regions using a first event agent. The embodiment may include determining whether the event is predicted to spread from the first region to a second region of the plurality or geographic regions. The embodiment may include generating a first dynamic event agent to monitor the event as a dynamic event based on determining that the event is predicted to leave the first region to the second region. The first dynamic event agent may receive information relating to the dynamic event, update a status of the dynamic event based on the received information, and transmit the received information. The embodiment may include generating, by a second subsystem, a second dynamic event agent for handling the dynamic event in the second region.

BRIEF DESCRIPTION OF THE SEVERAL VIEWS OF THE DRAWINGS

FIG. 9 shows an illustrative example of an event list.

FIG. 10 shows an illustrative example of a candidate event list.

FIG. 11 shows an illustrative example of a notification event list.

FIG. 21 shows example contents of the dynamic event status storage 1451 of a dynamic event agent.

FIG. 22 shows example contents of the local DEA information storage 1420 of an event server 210 executing a plurality of dynamic event agents.

FIG. 24A illustrates a state after "Region C DEA*" has issued DEA generation requests to event servers 210 of the subsystems 200 assigned to regions B and D. FIG.

24B illustrates a state after the state shown in FIG. 24A and after "Region B DEA" has issued a DEA generation request to an event server 210 of the subsystem 200 assigned to region A. FIG. 24C illustrates a state after the state shown in FIG. 24B, after the dynamic event has stopped occurring in regions A and D, and after "Region C DEA*" has issued notifications to the event servers of all dynamic event agents in the registry 1457 that the dynamic event is no longer occurring in region C, which is the region of the source DEA.

DETAILED DESCRIPTION

Hereinafter, example embodiments of the present invention will be described. The embodiments should not be construed as limiting the scope of the invention, which is defined by the claims. The combinations of features described in the embodiments are not necessarily essential to the invention.

Figure 1:
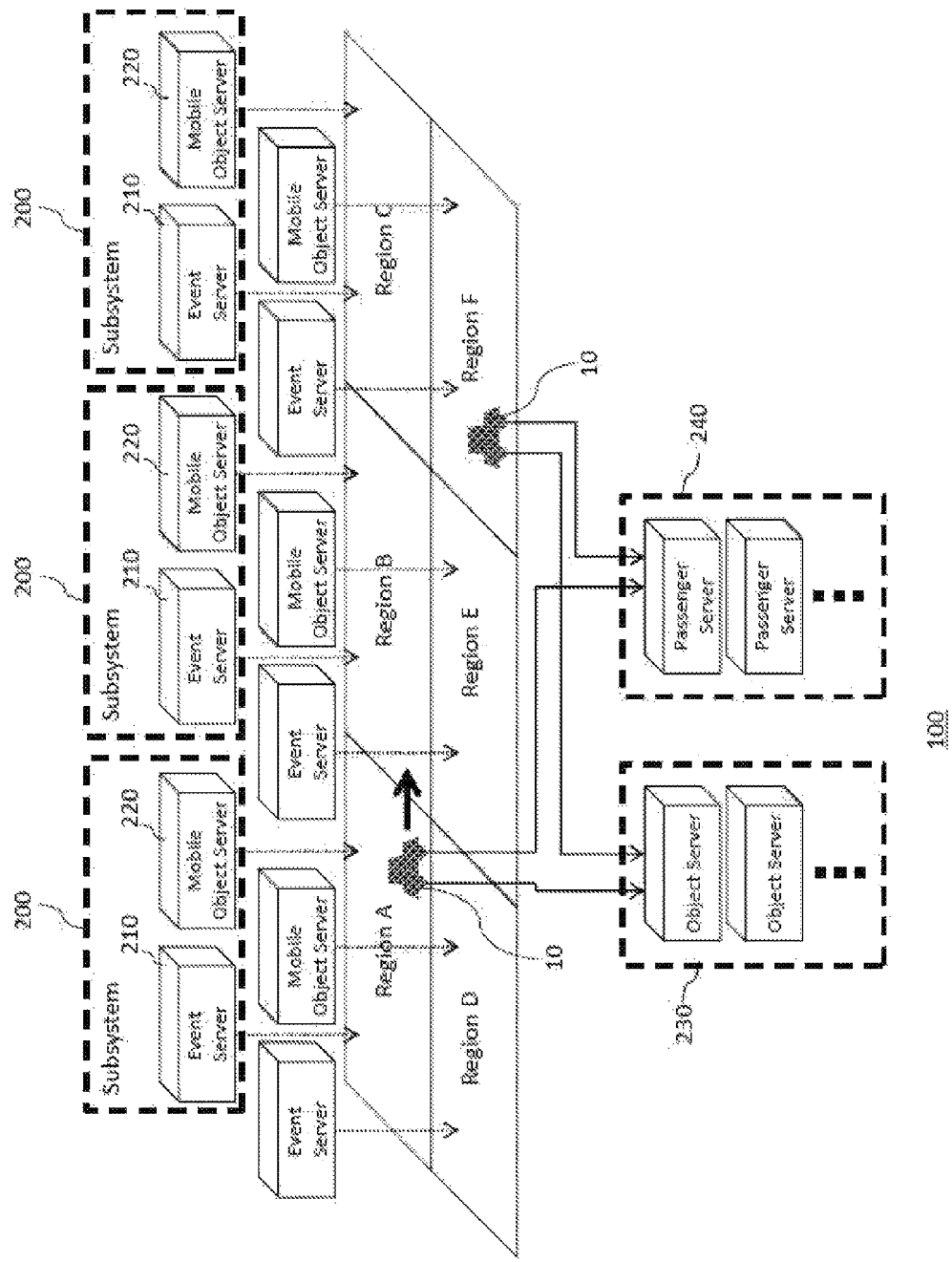
FIG. 1 shows a system 100 according to an embodiment of the present invention and a map area corresponding to a geographic space managed by the system 100.

FIG. 1 shows a system 100 and a map area corresponding to a geographic space managed by the system 100, according to an embodiment of the present invention. The system 100 manages a geographic space that includes routes on which a moving object 10 moves. The system 100 is operable to divide the geographic space into a plurality of regions and manage these regions. A moving object 10 may move on routes including land routes, sea routes, and/or air routes, for example. The geographic space may be land, sea, or air space that includes the routes on which the moving object travels. The moving objects 10 may be manned/unmanned automobiles, motorbikes, bicycles, humans having a digital device, airplanes, vessels, drones, or the like.

FIG. 1 shows an automobile as an example of the moving object 10, which moves along roads as examples of land routes. The system 100 includes a plurality of subsystems 200 that respectively manage the plurality of regions. FIG. 1 shows an example in which the map area is divided into six regions from region A to region F, and six subsystems 200 respectively manage these six regions.

System 100 comprises a plurality of event servers 210, a plurality of mobile object servers 220, a plurality of object servers 230, and a plurality of passenger servers 240. According to the embodiment of FIG. 1, each of the subsystems 200 may include at least one of the plurality of event servers 210 and one of the plurality of mobile object servers 220.

The plurality of event servers 210 manage events occurring in each of the regions of the geographic space. In one embodiment, the event server 210 of subsystem 200 assigned to region A may manage events in region A. The plurality of mobile object servers 220, respectively assigned to a plurality of regions in a geographic space, manage the moving objects 10 in each of the plurality of regions. In one embodiment, the mobile object server 220 assigned to region A may manage moving objects 10 located in region A. The object server 230 manages information of the moving objects 10 regardless of the location of the moving objects 10. The passenger server 240 manages information of at least one passenger riding in the moving objects 10.

Each of the subsystems 200 may be implemented on one or more servers. In one embodiment, each event server 210 and mobile object server 220 may be implemented on one server. In one embodiment, a set of an event server 210 and a mobile object server 220 in a subsystem 200 may be implemented by one server. Portions of the system 100 other than the subsystems 200 may also be implemented on one or more servers. In one embodiment, each object server 230 and passenger server 240 may be implemented on one server. In another embodiment, a set of object servers 230 and a set of passenger servers 240 may be each implemented by one server. In yet another embodiment, all of the object servers 230 and the passenger servers 240 may be implemented on one server. These servers may exist at any point on a network including the Internet, a subscriber network, a cellular network, or a desired combination of networks. The servers may be computers or other types of data processors, and may be dedicated servers, or may be shared servers that perform other operations.

The system 100 acquires the positions of a moving object 10 from the moving object 10, and the mobile object server 220 managing the region that includes the acquired position of the moving object 10 may manage the movement of this moving object 10. The system 100 acquires information of events that have occurred to the moving object 10 and/or on the road outside, and the event server 210 managing the region including the position where such an event has occurred may manage the state of the event.

This event may include information about accidents, obstructions, closure, limitation, status, or construction on the road, or information about the weather, temperature, buildings, shops, or parking lots near the road. In response to a setting or a request from the moving object 10, the subsystem 200 may provide notification about the event information to the moving object 10 that made the request. For example, if the moving object 10 is moving on a route in a geographical area corresponding to region A, then the mobile object sever 220 managing region A provides this moving object 10 with the notification about the event relating to the route.

Since the map area is divided into a plurality of regions, despite the moving object 10 simply moving on a route, the region corresponding to the position of the moving object 10 might change. FIG. 1 shows an example in which the moving object 10 is driving on a road such that the position of the moving object 10 moves from region A to region B. In this case, according to the movement of the moving object 10, the system 100 may transfer the information concerning the moving object 10 from the mobile object server 220 managing region A to the mobile object server 220 managing region B, and may also transfer the management of the moving object 10 to the mobile object server 220 managing region B.

Figure 2:
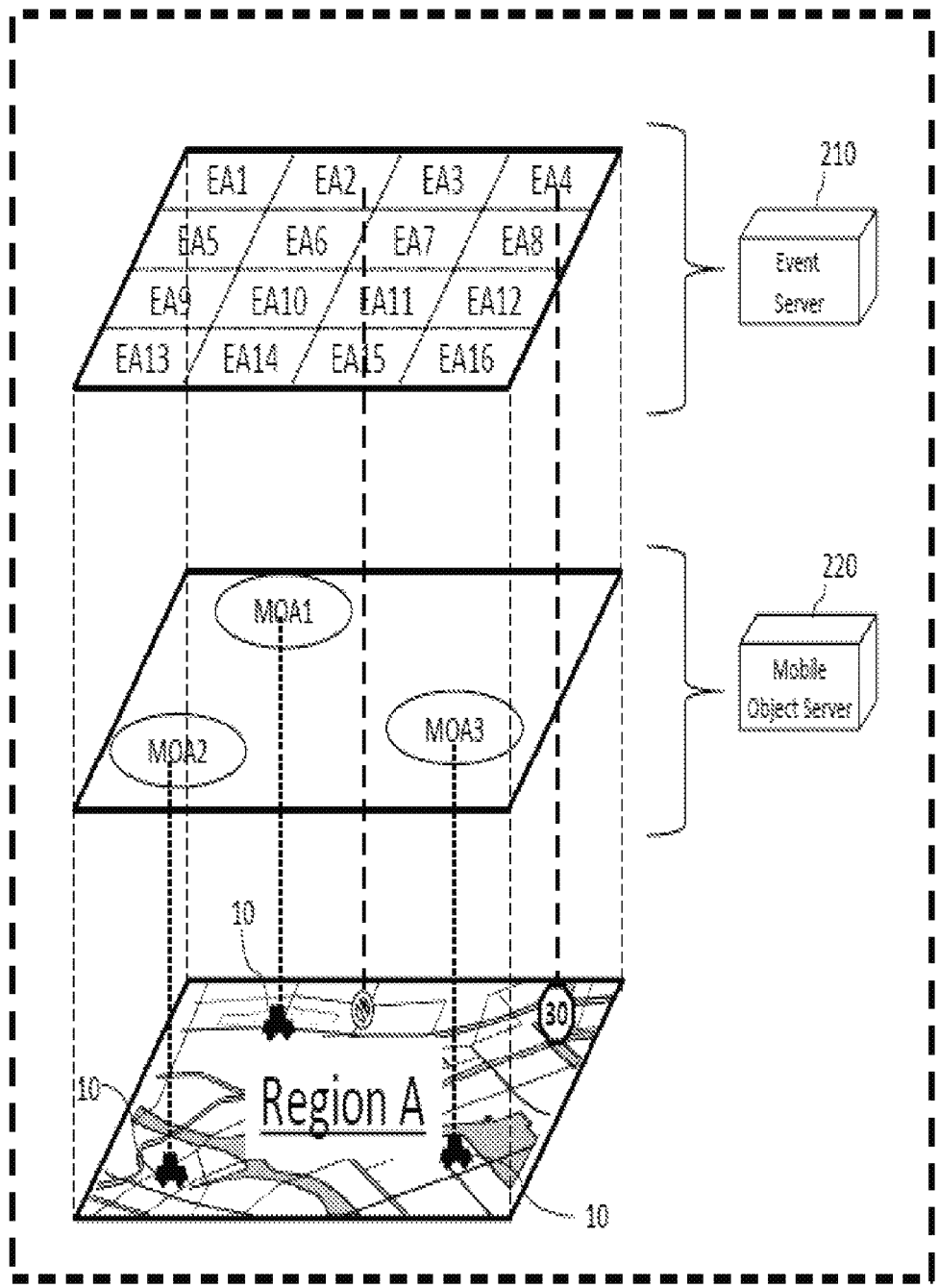
FIG. 2 shows a subsystem 200 according to an embodiment of the present invention and a map area corresponding to a region A managed by the subsystem 200.

FIG. 2 shows a subsystem 200 and a map area corresponding to a region A managed by the subsystem 200, according to an embodiment of the present invention. The event server 210 manages at least one event agent, and executes each event agent to manage events on routes in a region assigned to the event server 210. An "agent" may be a software entity having specific data, and may be operable to receive a message (e.g. command), and return a result of the message. Each region of the plurality of regions of geographic space includes at least a portion of one area of the plurality of areas. In this embodiment, the region assigned to the event server 210 is the same as the region assigned to the mobile object server 220. However, in other embodiments, these regions may be different.

In the embodiment of FIG. 2, the region A, which is the region assigned to the event server 210, is divided into 16 areas and 16 areas are assigned to each of the event agents EA1-EA16. The event server 210 executes each of the event agents EA1-EA16 to manage events occurring on routes of each area of region A. For example, the event agent EA2 may manage a "closure" event on an area corresponding to EA2 on the map, and the event agent EA4 may manage a "speed limit" event on an area corresponding to EA4 as shown in FIG. 2.

The plurality of mobile object servers 220 may include at least one mobile object server 220 including one or more mobile object agents, each of which is assigned to a moving object 10. In the embodiment of FIG. 2, the mobile object server 220 includes three mobile object agents MOAs 1-3 assigned to three moving objects 10 in the assigned region A. The mobile object server 220 executes each of the mobile object agents MOA1-MOA3 to manage the moving objects 10 traveling on the region A.

Figure 3:
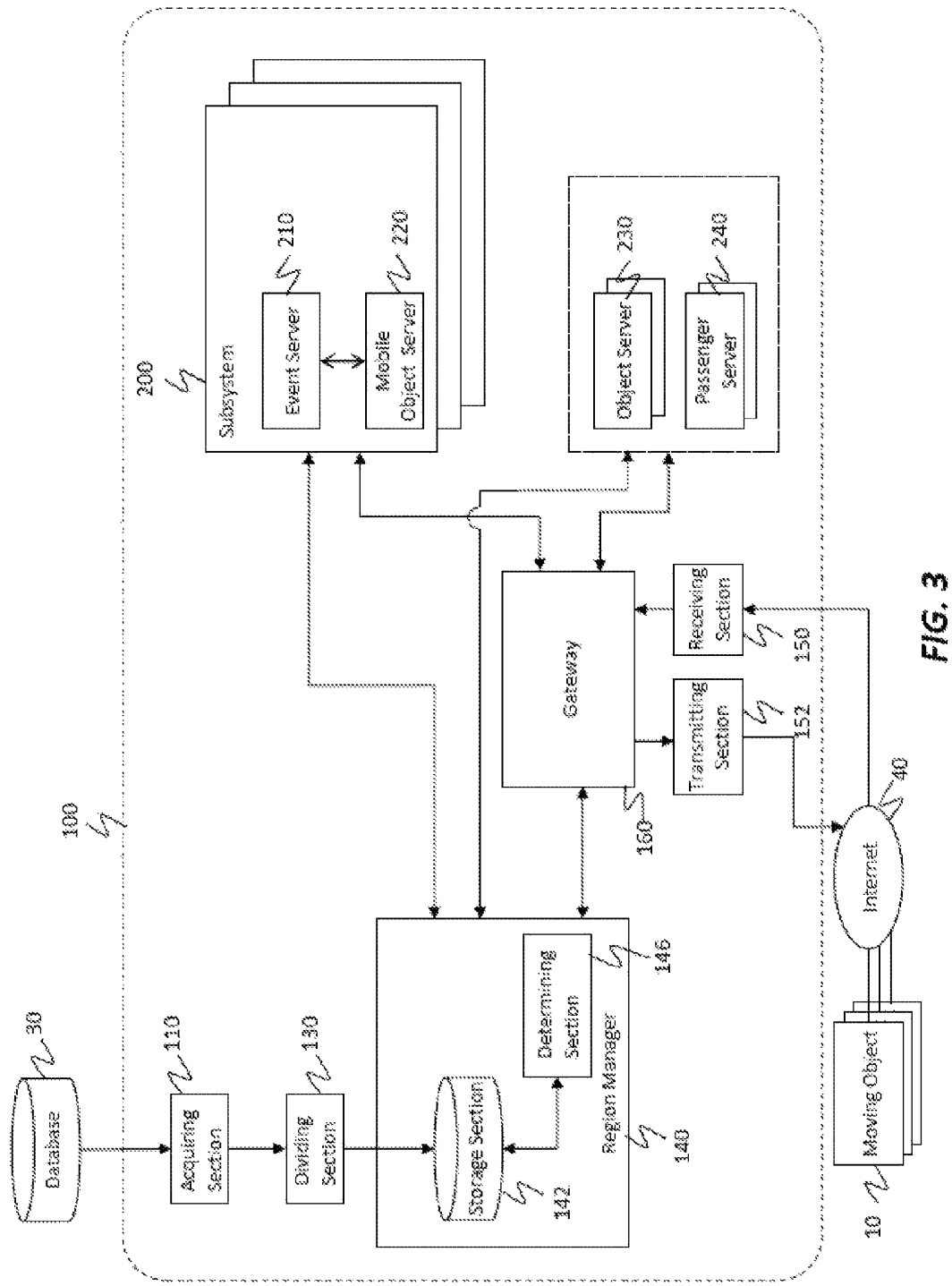
FIG. 3 shows a first exemplary configuration of the system 100 according to an embodiment of the present invention.

FIG. 3 shows an exemplary configuration of the system 100, according to an embodiment of the present invention. The system 100 may be operable to communicate with each of a plurality of moving objects 10 to send and receive the information used to manage the moving objects 10. The system 100 may be operable to acquire map data and/or information exchanged with the moving objects 10, through the Internet, a subscriber network, a cellular network, or any desired combination of networks. The system 100 includes an acquiring section (i.e., module) 110, a dividing section 130, a region manager 140, a receiving section 150, a transmitting section 152, a gateway apparatus 160, a plurality of subsystems 200, a plurality of object servers 230, and a plurality of passenger servers 240.

The acquiring section 110 may be operable to acquire map data corresponding to the geographical areas where a moving object 10 is positioned, from an external database 30, for example. In response to the map being updated, the acquiring section 110 may acquire some or all of the updated map data. The acquiring section 110 may be operable to acquire the map data from the Internet, a subscriber network, a cellular network, or any desired combination of networks. The system 100 may be operable to store the map data in advance.

The acquiring section 110 may further acquire an event that has occurred within the geographic space to be managed by the system 100. In this case, the acquiring section 110 may acquire accident information, traffic information, weather information, time information, etc.

The dividing section 130 may be operable to communicate with the acquiring section 110 and divide the map area into a plurality of regions. In this embodiment, the dividing section 130 generates two groups of regions by dividing an original map area into a plurality of regions.

The region manager 140 may be operable to store information concerning the plurality of regions including the regions resulting from the division. The region manager 140 may be operable to specify the subsystem 200 managing the region that includes the position of the moving object 10, in response to receiving the position of the moving object 10. The region manager 140 may be implemented on one or more servers.

The storage section 142 may be operable to communicate with the dividing section 130 and store information concerning the plurality of first regions and the plurality of second regions resulting from the division by the dividing section 130. The storage section 142 may store setting values or the like of the system 100.

The storage section 142 may store intermediate data, calculation results, threshold values, parameters, and the like that are generated by or used in the operations of the system 100. In response to a request from any component within the system 100, the storage section 142 may supply the data stored therein to the component making the request. The storage section 142 may be a computer readable storage medium such as an electric storage device, a magnetic storage device, an optical storage device, an electromagnetic storage device, or a semiconductor storage device.

The determining section 146 may be operable to communicate with the storage section 142, and determine one region from the plurality of regions (e.g., regions A-F of FIG. 1) in which each of the moving objects 10 is located based on the position information of the moving object 10 and geographic information of the plurality of regions. The determining section 146 may identify a route or position in the map area managed by the system 100 that corresponds to the position information of the moving object 10.

The determining section 146 may store the position information of this moving object 10 and/or information of the determined region in the storage section 142, in association with this moving object 10. The determining section 146 may store a history of the position information of this moving object 10 and/or a history of the determined mobile object server 220 in the storage section 142. The determining section 146 may be a circuit, a shared or dedicated computer readable medium storing computer readable program instructions executable by a shared or dedicated processor, etc.

The receiving section 150 may be operable to receive information transmitted from each of a plurality of moving objects 10. Each moving object 10 may transmit information at designated time intervals, and the receiving section 150 may sequentially receive this transmitted information. In this embodiment, the receiving section 150 may receive car probe data from each moving object 10 as the information. The car probe data may include information detected by the moving object 10, such as position information of the moving object 10.

In one embodiment, the position information may include longitude and latitude (and optionally altitude information) of the moving object 10 in an absolute coordinate system. In another embodiment, the moving object 10 may determine its location in the absolute coordinate system by using GPS, and the determining section 146 receiving the position information may determine a route on which the moving object 10 exists and a specific location of the route at which the moving object 10 exists based on the position information. Alternatively, the moving object 10 may include such detailed position information in the car probe data.

The receiving section 150 may communicate with the plurality of moving objects 10 and receive the car probe data of each moving object 10, via the Internet 40. The receiving section 150 may receive the car probe data of the plurality of moving objects 10 through wireless communication, a subscriber network, a cellular network, or any desired combination of networks.

The transmitting section 152 may be operable to transmit event information to each of the moving objects 10 according to settings, for example. The transmitting section 152 may transmit information concerning the route on which the moving object 10 is expected to travel. The transmitting section 152 may communicate with the moving objects 10 and transmit each type of information to the moving objects 10 via the Internet 40. The transmitting section 152 may transmit each type of information to the moving objects 10 through wireless communication, a subscriber network, a cellular network, or any desired combination of networks.

The gateway apparatus 160 may be operable to transfer communication between the plurality of subsystems 200 and the plurality of moving objects 10. The gateway apparatus 160 may communicate with the receiving section 150 and receive the information transmitted by each moving object 10.

The gateway apparatus 160 may communicate with the region manager 140 and demand the transfer destination for each piece of information received from the moving objects 10, of the region manager 140. In response to this request, the gateway apparatus 160 may receive from the region manager 140 the information of the subsystem 200 managing the region on which the moving object 10 exists. The gateway apparatus 160 may transfer the information received from the moving object 10 to the subsystem 200 that is to manage the moving object 10. In other words, the gateway apparatus 160 may transfer the information received from each moving object 10 to the subsystem 200 determined by the region manager 140.

The gateway apparatus 160 may communicate with each of the subsystems 200, and receive the information transmitted by each subsystem 200. The gateway apparatus 160 may communicate with the transmitting section 152 and supply the transmitting section 152 with the information received from each subsystem 200, such that this information is transferred to the moving objects 10 designated for each subsystem 200.

The gateway apparatus 160 may include a plurality of gateway devices, and may quickly perform transfer between the plurality of subsystems 200 and the plurality of moving objects 10. In this case, the receiving section 150 may function as a load balancer that supplies the information from the moving objects 10, such that the load is spread among the plurality of gateways. The load balancer may sequentially supply information from the moving objects 10 to the gateways having lighter loads. The gateway apparatus 160 may be a network that provides a connection between a plurality of networks using the same or different types of protocols.

A plurality of subsystems 200 may be operable to communicate with the region manager 140 and the gateway apparatus 160 and to respectively manage a plurality of regions in a geographic space. Each subsystem 200 is operable to manage moving objects 10 that travel routes in its managing region and to manage events on its managing region.

As described, each subsystem 200 may include the event server 210 and the mobile object server 220. The event server 210 manages events occurring on its managing region with the plurality of the event agents. In one embodiment, the event server 210 may perform, through the event agent, (i) registration, update and/or deletion of events, (ii) registration, update and/or deletion of candidate events, and (iii) provision of event information.

The mobile object server 220 manages the plurality of the mobile objects 10 traveling on its managing region with the plurality of the mobile object agents. In one embodiment, the mobile object server 220 may perform, through the mobile object agent, (i) processing of the car probe data, (ii) update of information of the mobile object, and (iii) provision of information to the mobile object. For example, the mobile object server 220 may execute the mobile object agent to collect information of events from at least one event server 210, and provide the moving object 10 with information that assists the moving object 10 with traveling in the geographic space.

A plurality of object servers 230 including at least one object server 230 may communicate with the gateway 160 and include an object agent (OA) containing information of the moving object 10. An object agent may correspond to each moving object 10 and contain information thereof. In one embodiment, the object agent may contain (i) information, by region, of which subsystem currently manages a mobile object agent of the moving object 10, (ii) an identification (ID) of the moving object 10, (iii) an ID of a passenger of the moving object 10, and (iv) a characteristic of the moving object 10 (e.g., model/version information, width, length, and/or height of the moving object 10).

The object server 230 may perform, through the object agent, (i) provision and/or update of information of the moving object 10, (ii) registration, update, and/or deletion of the ID of passenger riding on the moving object 10, (iii) provision and/or update of the information of the region of the moving object 10, and (iv) provision of information needed for generation of a new mobile object agent by the mobile object server 220.

At least one passenger server 240 of a plurality of passenger servers may communicate with the gateway 160, and include a passenger agent that contains information of at least one passenger. A passenger agent may correspond to each passenger or candidate passenger of moving objects 10, and contain information thereof. In one embodiment, the object agent may contain an ID of a passenger and a characteristic of the passenger (e.g., information of age, gender, type, and the like of license of the passenger). The passenger server 240 may perform, through the passenger agent, provision and/or update of information of the passengers.

As described above, the system 100 of the present embodiment may manage the moving objects by utilizing the mobile object agents in each mobile object server 220, and manage the events by utilizing the event agent in each event server 210. According to the system 100 of the embodiment, the system 100 can separately manage information relating to the moving objects 10 and events on the geographic map with a plurality of kinds of servers. Furthermore, the plurality of mobile object servers 220 can smoothly transfer the management of the moving objects 10 traveling across the regions via the mobile object agents, thereby improving the efficiency of the whole system 100. In addition, according to the system 100 of the embodiment, each event server 210 divides event management in one region among the plurality of event agents and provides the mobile object agent with event information, thereby improving the efficiency of event management in the region (e.g., improving response time of event search) and thus event notification to the moving objects 10. In addition, the system 100 can provide the mobile object agent with information of moving object 10 by the object agent of the object server 230. The system 100 can also provide the mobile object agent with information of passengers of the moving objects 10 by the passenger agent of the passenger server 240.

Figure 4:
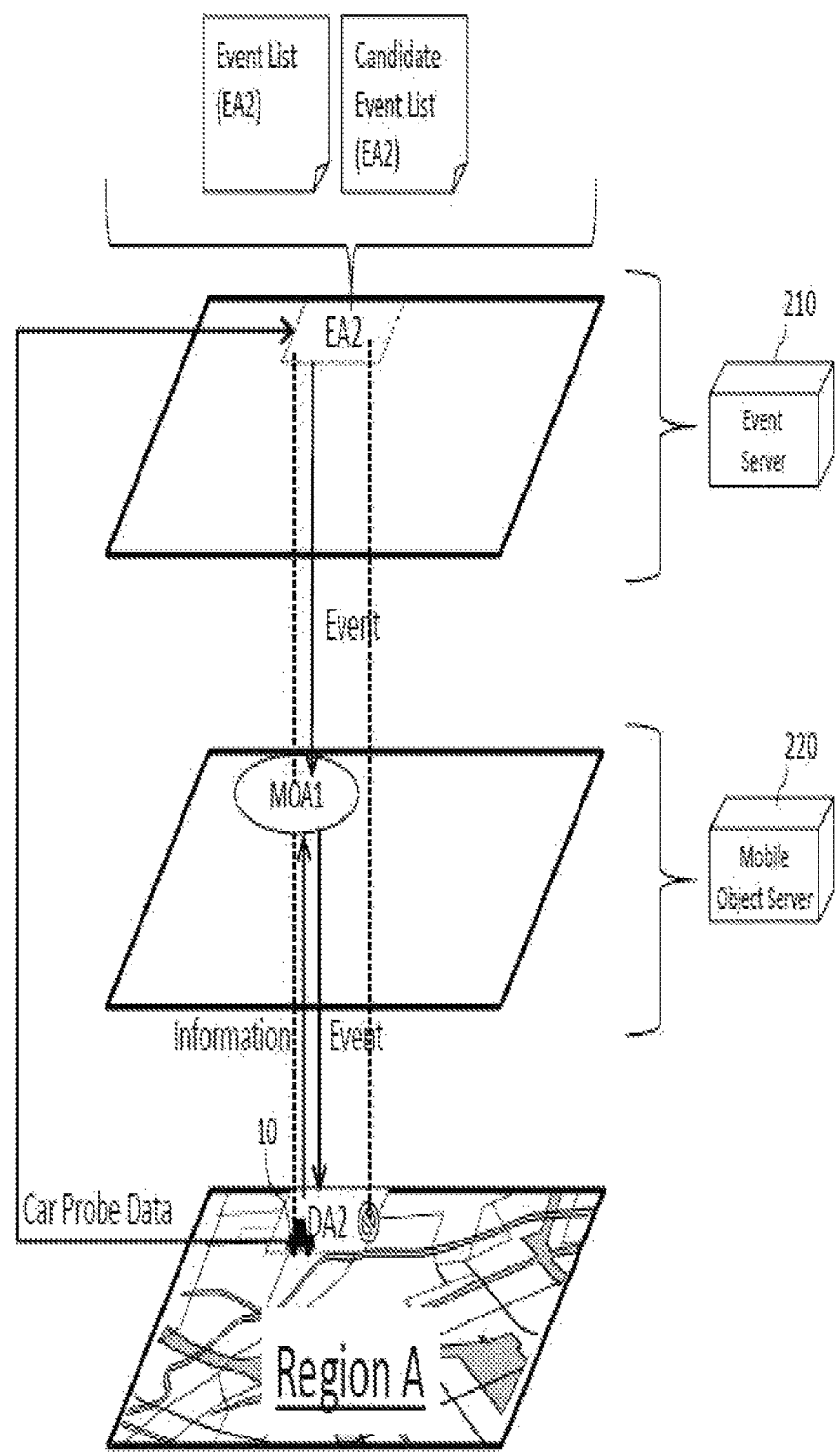
FIG. 4 shows management of events by the event server 210 and the mobile object server 220 according to an embodiment of the present invention.

FIG. 4 shows management of events by the event server 210 and the mobile object server 220, according to an embodiment of the present invention. In this embodiment, a moving object 10 is traveling on a target route on region A and transmitting a car probe data including the position information to the event server 210 managing region A with the car probe data via a gateway apparatus, such as the gateway apparatus 160. The event server 210 manages event information through each event agent based on the car probe data from the moving objects on region A. For example, each event agent may manage an event list (containing information of an event and an influence event for routes on the area managed by the event agent) and a candidate event list (containing information of candidates of an event for routes on the area managed by the event agent).

In the embodiment of FIG. 4, the event agent EA2 manages events of an area (indicated as "DA2" on the region A of FIG. 4) by the event list of the event agent EA2 and the candidate event list of the event agent EA2 based on car probe data from the moving object 10 on the area DA2. For example, the event agent EA2 assigned to the area DA2 is executable to generate an event based on the information from the moving object 10.

In one embodiment, each mobile object server 220 is operable to receive information from the moving object 10 in the region A assigned to the mobile object server 220. The mobile object server 220 determines the target route where the moving object 10 is located. The mobile object server 220 sends the information to one event server 210 assigned to a region A where the moving object 10 is located, and thereby requests the event agent EA2 assigned to the area DA2 where the target route is located to send an event list containing information of an event on the target route and the influence event of the target route.

The mobile object server 220 executes the mobile object agent MOA1 for the moving object 10 to provide the moving object 10 with information that assists the moving object 10 with traveling in the area DA2 based on the information of the event on the other route and the influence event of the target route. In the embodiment of FIG. 4, the mobile object agent MOA1 receives, from the event agent EA2, the event information of the route on which the moving object 10 exists, and provides the moving object 10 with the event information (e.g., information of closure).

Figure 5:
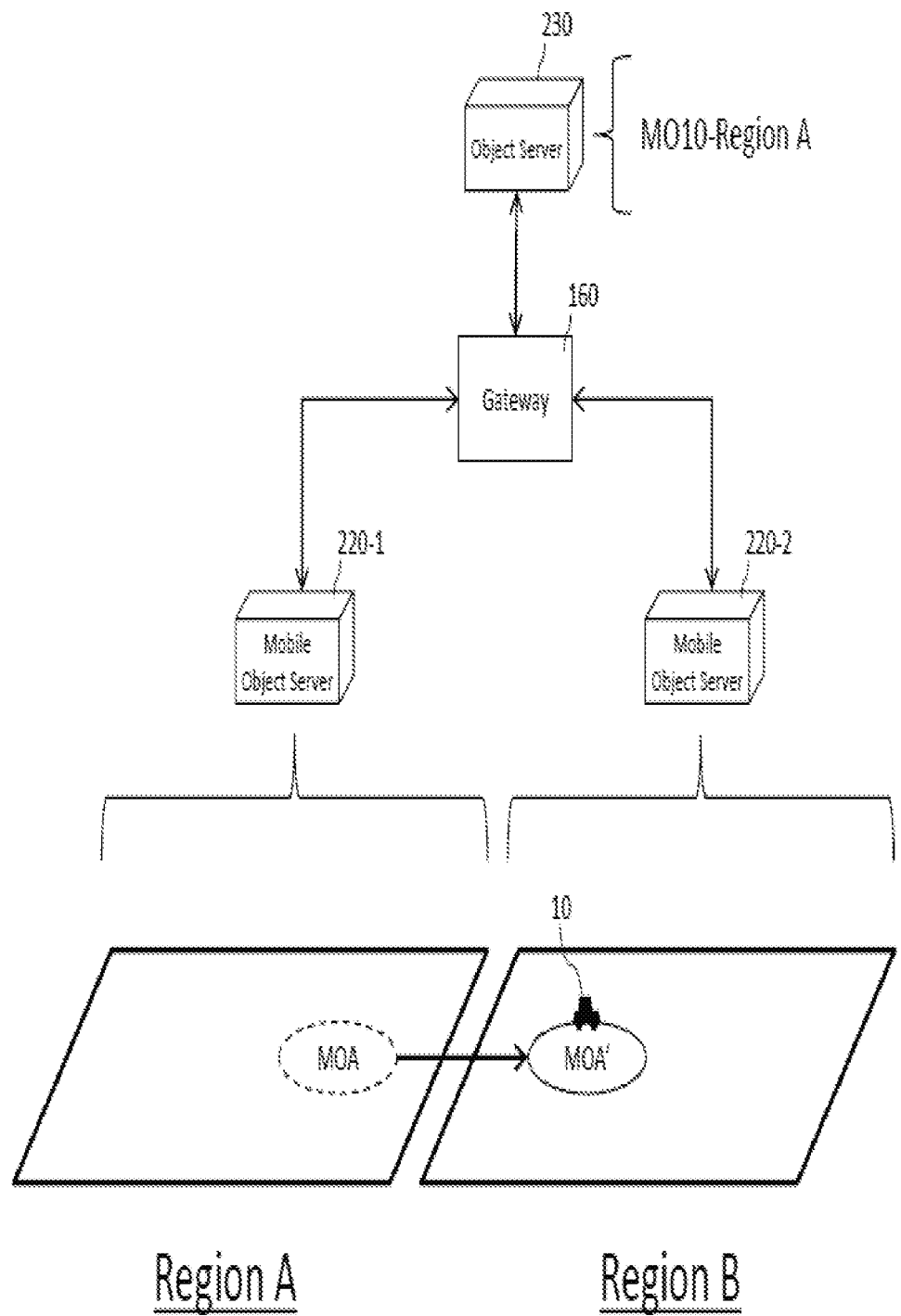
FIG. 5 shows management of moving object by the mobile object server 220 and object server 230 according to an embodiment of the present invention.

FIG. 5 shows management of a moving object 10 by the mobile object servers 220 and object server 230, according to an embodiment of the present invention. The mobile object server 220-1 may transfer the mobile object agent to the mobile object server 220-2 assigned to a neighboring region in response to the moving object 10 moving to the neighboring region. In this embodiment, in response to a moving object 10 traveling from region A to region B, the mobile object server 220-1 managing region A deletes the mobile object agent MOA for the moving object 10, and a mobile object server 220-2 managing region B generates a mobile object agent MOA for the moving object 10.

In this embodiment, the object agent 230 may store information that includes a mobile object server identifier MOS-ID that identifies one of the plurality of mobile object servers 220 executing the mobile object agent corresponding to the moving object 10. Just after the moving object 10 arrives at region B, the mobile object server 220-2 has not been executing the mobile object agent for the moving object 10. The mobile object server 220-2 is operable to receive information from the moving object 10 in region B assigned to the mobile object server 220-2.

Using the information from the moving object 10, the mobile object server 220-2 obtains the mobile object server identifier MOS-ID from the object server 230 that manages the object agent for the moving object 10 because the mobile object server 220-2 is not executing the mobile object agent for the moving object 10. The mobile object server 220-2 requests a mobile object server 220-1 identified by the mobile object server identifier MOS-ID to transfer the mobile object agent for the moving object 10. Then the mobile object server 220-1 managing region A transfers the mobile object agent to the mobile object server 220-2 assigned to a neighboring region B in response to the request.

Figure 6:
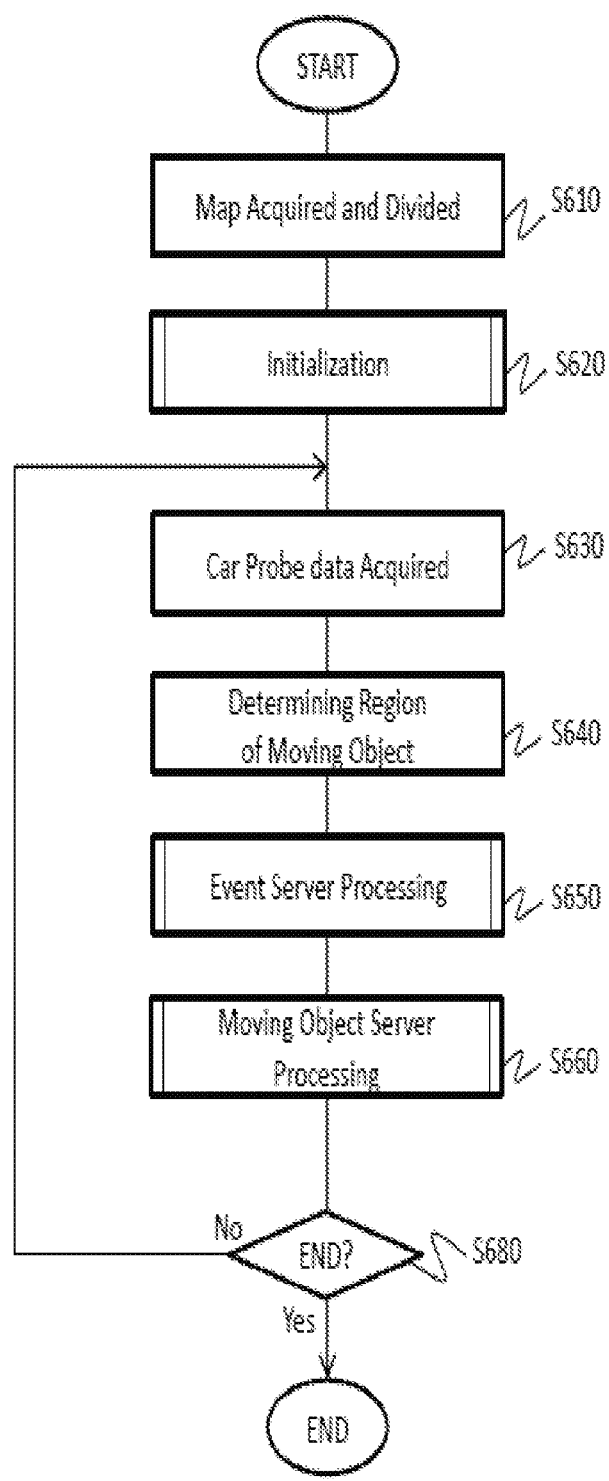
FIG. 6 shows an operational flow of an exemplary configuration of the system 100 according to an embodiment of the present invention.

FIG. 6 shows an operational flow of the system 100 according to an embodiment of the present invention. In the example shown in FIG. 6, the system 100 performs the operations from S610 to S680 to manage moving objects, such as moving object 10, and events on a map area. However, the system 100 shown in FIGS. 1-5 is not limited to using this operational flow. Also, the operational flow in FIG. 6 may be performed by a modified system or a different system that differs from the system 100 shown in FIGS. 1-5.

First, an acquiring section, such as the acquiring section 110, may acquire the map data of the geographic space to be managed by the system (S610). The acquiring section may acquire map data of a geographic space that includes one or more cities, one or more towns, and the like. The acquiring section may include map data of a geographic space including one or more states, countries, continents, etc. A dividing section, such as the dividing section 130, may divide the map area to generate a plurality of regions.

Next, the system may perform an initialization process for the moving object (S620). The system may perform the process of S620 if a user (passenger) initializes a setting of a moving object and any passengers of the moving object, before starting to drive the moving object.

After S620, a gateway apparatus, such as the gateway apparatus 160, of the system may acquire a car probe data from the moving object (S630). Although the system may acquire the car probe data from the plurality of the moving objects, the system acquiring a car probe data from one moving object (which, may be referred to as "a target moving object") is explained in the below description. The car probe data may include information detected by the target moving object, such as current position information of the target moving object, a speed and/or direction of the target moving object, and event information observed by the target moving object (e.g., occurrence of ABS, detection of obstacles, or the like). In one embodiment, the position information may include a route ID of a route on which the target moving object exists and the distance between the current location of the target moving object and one end of the route.

Next, the gateway apparatus may determine a region on which the target moving object is traveling based on the position information of the car probe data of the target moving object (S640). In one embodiment, the gateway apparatus may inquire a region manager, such as the region manager 140, about the region on which the moving exists. A determining section, such as the determining section 146, of the region manager may determine the region of the target moving object and provide the gateway apparatus with the information of the region of the target moving object. The gateway apparatus may provide an event server, such as the event server 210, that manages the determined region and a mobile object server, such as the mobile object server 220, that manages the determined region with the car probe data.

Next, the event server that is provided with the car probe data of the target moving object may process events for the moving objects (S650). The event server may manage event information based on the car probe data for notification of events to the target moving object.

After S650, the mobile object server that is provided with the car probe data of the target moving object may manage a mobile object agent for the target moving object (S660).

After S660, the system determines whether to end the process for the target moving object. In one embodiment, the gateway apparatus may determine whether the car probe date indicates the engine stop of the target moving object. If the system determines not to end the process, then the system proceeds with the process of S630 for the target moving object. If the system determines to end the process, then the system ends the process for the target moving object, and may continue the process for other moving objects.

As described above, the system manages moving objects by utilizing mobile object agents realized by the plurality of mobile object servers. Since the system can transfer the mobile object agent between the mobile object servers, it can efficiently manage moving objects traveling between the plurality of regions. Furthermore, the system collects car probe data from the moving objects and manages events generated from the car probe data by utilizing the event agents. Since each event server divides a number of events occurring on its managing region into a plurality of areas by utilizing the event agents, it can efficiently handle event information.

The process of S610 may be performed once before starting processes S620-S680. The process of S620-S680 may be performed for every moving object.

Figure 7:
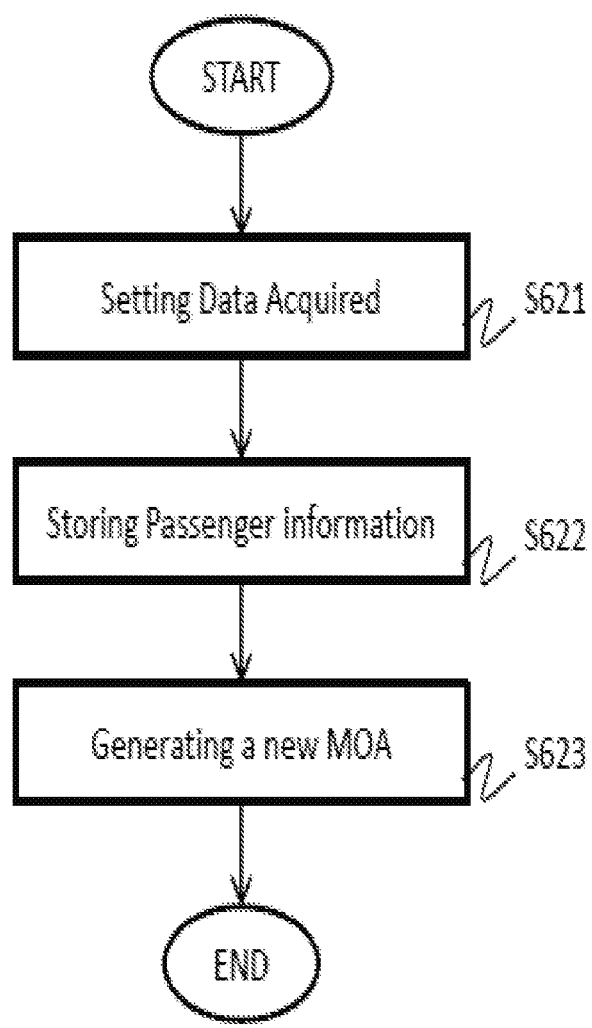
FIG. 7 shows an example operational flow of S620 of the operational flow of FIG. 6.

FIG. 7 shows an operational flow of an initialization process for a moving object, according to an embodiment of the present invention. The present embodiment describes an example in which the system performs an initialization process, such as the initialization process of S620 of FIG. 6, through processes S621 to S623 shown in FIG. 7.

First, a gateway apparatus receives setting data (including an ID of the moving object, an ID(s) of passenger(s) and position information of the moving object) from the moving object (S621). The gateway apparatus determines one mobile object server that manages the moving object based on the position information of the moving object. The gateway apparatus provides the determined mobile object server with the setting data. Then, the determined mobile object server obtains information (e.g., ID(s) of the passenger(s)) of at least one passenger of the moving object from the setting data of the moving object.

Then, the mobile object server may request the object agent of the object server for the moving object to store the information of the at least one passenger of the moving object (S622). For example, each moving object may be mapped to each object agent of the object servers based on values of the IDs of the moving objects, and the mobile object server may identify one object agent corresponding to the ID of the moving object based on a calculation using the ID. Then, the mobile object server may provide the object server managing the identified object agent with the setting data including the position information, the ID of the moving object, and ID(s) of passenger(s) of the moving object via the gateway apparatus.

Next, the object server stores the information of passenger(s) on an object agent. In one embodiment, each passenger may be preliminarily mapped to a passenger server based on values of the IDs of the passengers, and the passenger servers may have information of passengers. The object server may identify one passenger server corresponding to the ID of a passenger based on a calculation using the ID. The object server may receive, via the gateway apparatus, the information of passengers from the passenger server corresponding to the ID. Then, the object server may store or update the information of the moving object and the passengers of the moving object, in the object agent for the moving object. The object server may include the information of a region in which the moving object currently exists, in the object agent.

Next, the mobile object server 220 managing the region in which the moving object 10 exists generates a new mobile object agent for the moving object 10 (S623). In one embodiment, the mobile object server 220 may copy the information of the object agent for the moving object 10 to the newly generated mobile object agent. For example, the mobile object server 220 may store the information of the moving object 10 and the information of the at least one passenger of the moving object 10 in the newly generated mobile object agent for the moving object 10.

Figure 8:
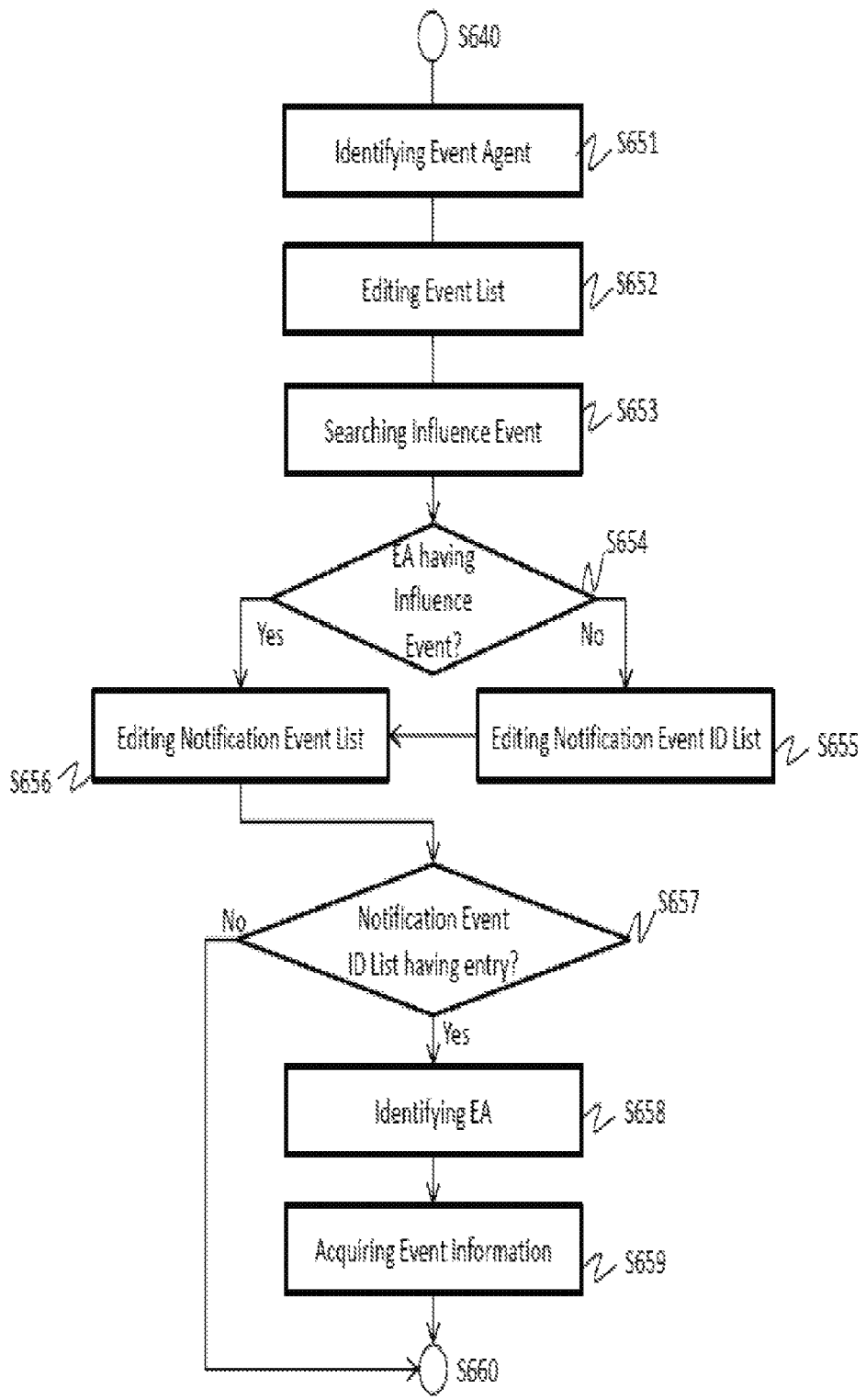
FIG. 8 shows an example operational flow of S650 of the operational flow of FIG. 6.

FIG. 8 shows an operational flow of event processing, according to an embodiment of the present invention. The present embodiment describes an example in which the system performs event processing, such as the event processing of S650 of FIG. 6, through processes S651 to S659 shown in FIG. 8.

First, the event server may identify an event agent (S651). In one embodiment, the event sever determines one event agent from the plurality of event agents based on the position information of the target moving object. The determined event agent may be referred to as a "target event agent." For example, the event server determines a target route (or an edge of the map data) of the target moving object based on the position information and the map data, and selects, as a target event agent, an event agent that manages an area including the target route of the target moving object indicated by the car probe data. In another embodiment, the car probe data of a target moving object may include the information of the target route of the target moving object.

Next, the event server may edit event lists by the target event agent based on the car probe data (S652). In one embodiment, the target event agent may generate or update information of events (e.g., a route on which an event occurs, an event ID, a location of an event, and content of event) of the target route on the event list based on information of the car probe data. The event of the target route may be referred to as a "target event."

Next, the event server may search, by the target event agent, an influence event on the target route on the area of the target event agent based on the car probe data (S653). The influence event of the target route relates to an event on another route within a threshold distance (e.g., a threshold travelling distance of the target route, a threshold number of edges away from the target route, and/or a threshold travelling time from the target route).

In one embodiment, the target event agent itself may search for routes (or edge IDs) apart from the target route within the threshold distance based on topology information of routes in the regions, or may request other entities (e.g., a server) to search for routes (or edge IDs).

Next, the event server may determine whether the event list of the target event agent includes event entries corresponding to all influence events of the target route searched at S653 (S654). In one embodiment, the target event agent determines whether routes of the influence events are listed as edge IDs of events in the event list.

If an area managed by a target event agent includes the routes (edges) of all influence events relating to an event, then an event list of the target event agent includes corresponding event entries of all influence events. However, if the routes (edges) of any influence events are managed by other event agents, then the event list may not include corresponding event entries of all influence events. If the decision is positive, then the event server proceeds with the process S655 and if negative, the event server proceeds with the process S656.

At S655, the event server may edit a notification event ID list by the target event agent. The notification event ID list includes IDs of influence events and edge IDs of the influence events that are determined to be not included in the event list of the target event agent at S654. In other words, the notification event ID list is a list of event IDs of influence events that are not managed by the target event agent. Then, the event server may proceed with the process of S656.

At S656, the event server may edit a notification event list for the target moving object, by the target event agent. The notification event list is a list of events that may be helpful to the target moving object traveling on the target route. The notification event list may include target events and influence events of the target events. The target event agent may add entries of the target events and the influence events in its managing event list for notification.

Next, the event server determines, by the target event agent, whether the notification event ID list has at least one entry. If the decision is positive, then the event server proceeds with the process of S658, and if negative, then the event server ends the process of S650.

At S658, the event server may identify, by the target event agent, an event agent that manages an event list including events in the notification event ID list. The determined event agent may be referred to as "remote event agent."

Next, the event server may acquire information of events in the notification event ID list (S659), and end the process S650. In one embodiment, the target event agent may receive information of events in the notification event ID list from the remote event agent, and edit the notification event list based on the acquired information. In another embodiment, the target event agent may add entries of the influence events in the notification event ID list based on the acquired information.

FIG. 9 shows an illustrative example of an event list, according to an embodiment of the present invention. As described in FIG. 9, the event list may include edge IDs of events, event IDs of events, locations of events, specific contents of events, and influence events relating to events. In this embodiment, each route is represented as "edge." For example, this event list indicates that an event (identified as "Eve 0214") has occurred along the full length of edge 0001 on the area, that the event has limited the speed to 30 km/h, and that edge 0001 includes an influence event identified as "Eve 0114." The event list also indicates that an event (identified as "Eve 0114" on edge 0002) has occurred 32 m from the 1st node on edge 0002 on the area, that the event is a closure of a route, and that edge 0001 includes influence events identified as "Eve 0214" on edge 0001, "Eve 0421" on edge 0003, etc. In one embodiment, the target event agent may add a new entry corresponding to an event detected by the car probe data, in the event list.

According to the first entry in the event list of FIG. 9, the edge 0001 has influence event 0114. This may mean that a moving object traveling on the edge 0001 is influenced by the event 0114 that has occurred apart from edge 0001 within a threshold distance. In response to receiving the car probe data including the position information indicating that the target moving object is traveling on the edge 0001, the target event agent searches and obtains routes (edge IDs) apart from the target route (edge 0001) within the threshold distance, and then finds neighboring edge 0002 as a result. In response to receiving the car probe data including the position information of the edge 0001, the target event agent determines whether the edge of influence event (edge 0002) corresponding to the target route is listed as edge IDs in the event list.

The target event agent assigned to the area may generate or update a candidate event based on information from the target moving object. In one embodiment, the target event agent may generate or update candidate events on the candidate event list including information of a plurality of edges on the area of the event agent based on information of the car probe data.

Although the event list of FIG. 9 includes information of influence events, the information of the influence events may be managed by another list. In one embodiment, the event agent may manage both a first event list containing information of an event on the target route and a second event list containing information of the influence event.

FIG. 10 shows an illustrative example of a candidate event list, according to an embodiment of the present invention. As described in FIG. 10, the event list may include edge IDs of candidate events, counts of detecting candidate events, locations of candidate events, and specific contents of candidate events for each candidate event. For example, this candidate event list indicates that evidence of an event (congestion) has been observed twice along the full length of edge 0009 on the area, and that evidence of an event (skid) has been observed once at a point 15 m from the 2nd node on edge 0013 on the area.

The target event agent may determine whether to change a candidate event in the candidate event list to an event in the event list. In one embodiment, the target event agent may upgrade the candidate event to the event based on information from other moving objects. In this case, the target event agent counts occurrences of a candidate event observed by a plurality of moving objects (including the target moving object and other moving objects). If the count of a candidate event exceeds a threshold value, then the target event agent determines that the candidate event is upgraded to an event. In one embodiment, in response to the upgrade, the target event agent deletes the entry of the candidate event from the candidate event list, and generates a new entry of an event corresponding to the deleted candidate event. The event servers may set the same or different criteria for upgrading candidate events among the plurality of event agents.

FIG. 11 shows an illustrative example of a notification event list, according to an embodiment of the present invention. As described in FIG. 11, the notification event list may include edge IDs of target/influence events, event IDs of target/influence events, locations of target/influence events, and specific contents of target/influence events. For example, this notification event list indicates that an event (speed limit) has occurred along the full length of edge 0001 on the area, and that an event (closure) has occurred at a point 32 m from the 1st node on edge 0002 on the area.

Figure 12:
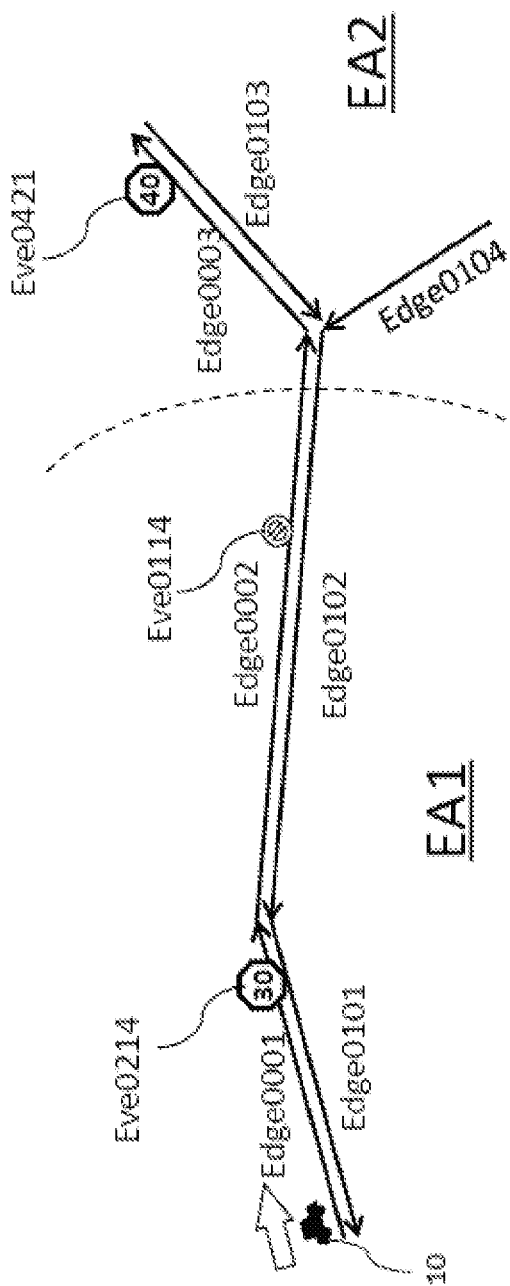
FIG. 12 shows a moving object 10 and events according to an embodiment of the present invention.

FIG. 12 shows a moving object and events, according to an embodiment of the present invention. In the embodiment of FIG. 12, the target moving object 10 is traveling eastbound on the edge 0001, which is the target route. The target event agent EA1 manages an area including the edge 0001, the edge 0002, the edge 0101, and the edge 0102, and the neighboring event agent EA2 manages an area including the edge 0003, the edge 0103, and the edge 0104.

Direction dependent edges are described in FIG. 12. However, edges may not be direction dependent according other embodiments, and in such embodiments, the event agent may manage events, candidate events, and influence events with direction information. The target event agent EA1 manages an event (Eve 0214) on the edge 0001 as the target event in the event list. Since the edge 0002 is apart from the edge 0001 within the threshold distance, the target event agent EA1 also manages an event (Eve 0114) on the edge 0002 as an influence event in the event list. The target event agent EA1 manages a notification event list including the target event (Eve0214) and the influence event (Eve 0114) for the target moving object 10.

In the embodiment of FIG. 12, the mobile object agent managing target moving object requests the event agent EA1 that manages the target event (e.g., Eve 0214) and the influence event (e.g., Eve 0114) to send the notification event list including the target event and the influence event. In another embodiment, the mobile object agent may request the remote event agent EA2 that manages the information of influence event(s) (e.g., Eve0421) to send a notification event list containing information of the influence event(s) if the influence event is located outside of the area including the target route (Edge 0001).

Figure 13:
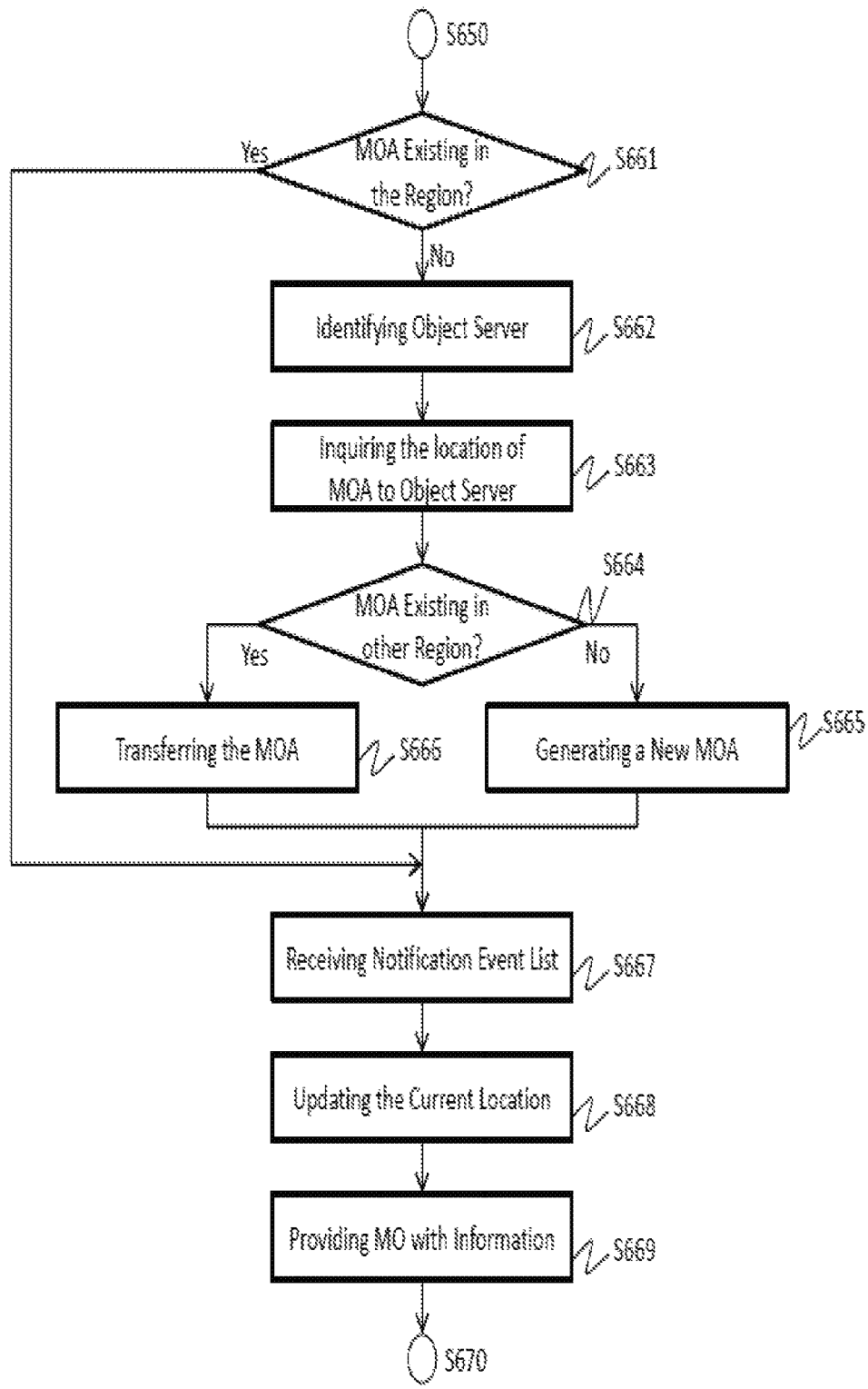
FIG. 13 shows an example operational flow of S660 of the operational flow of FIG. 6.

FIG. 13 shows an operational flow of moving object processing, according to an embodiment of the present invention. The present embodiment describes an example in which the system manages the target mobile object, such as in S660 of FIG. 6, through processes S661 to S669 shown in FIG. 13.

At S661, the mobile object server may determine whether the mobile object agent for the target moving object exists in the region determined to be the region of the moving object, such as the region determined at S640. In other words, the mobile object server determines whether the mobile object server manages the mobile object agent of the target moving object. If the decision is positive, then the mobile object server proceeds with the process S667, and if negative, the mobile object server proceeds with the process S662.

At S662, the mobile object server may identify an object server that includes the object agent containing the information of the target moving object. In one embodiment, the mobile object server may identify the object server in the same manner described in S622.

Next, at S663, the mobile object server may inquire the object server 230 identified at S662 for the location of the mobile object agent of the target moving object. The object server may refer to the object agent of the target moving object, obtain information of the mobile object server that currently manages the mobile object agent MOA of the target moving object, if it exists, and provide the mobile object server with the information.

Next, the mobile object server may determine whether the mobile object agent for the target moving object exists in any other regions. In other words, the mobile object server may determine which mobile object server manages the mobile object agent for the target moving object from the plurality of mobile object servers managing other regions, at S663. If the decision is positive, then the mobile object server proceeds with the process S666, and if negative the mobile object server proceeds with the process S665.

At S665, the mobile object server generates a new mobile object agent MOA for the target moving object. The mobile object server may generate the mobile object agent MOA for the target moving object by obtaining information of the target moving object from the object server that includes the object agent containing the information of the target moving object. In one embodiment, the mobile object server may generate the new mobile object agent in the same manner described in S623. The mobile object server may also communicate with the object server via the gateway apparatus, and register the current region of the target moving object in the object agent corresponding to the target moving object. By generating the new mobile object agent, the system can handle a new moving object 10 that has been not managed by the mobile object server.

At S666, the mobile object server may transfer the mobile object agent from the other mobile object server determined to manage the mobile object agent for the target moving object at S664. In one embodiment, the mobile object server may receive information of the mobile object agent for the target moving object from the other mobile object server, and generate a new mobile object agent including the received information. The mobile object server may also communicate with the object server via the gateway apparatus, and register the current region of the target moving object in the object agent of the target moving object.

Next, at S667, the mobile object server may receive a notification event list for the target moving object. In one embodiment, the mobile object server first determines the target route where the target moving object is located. Then, the mobile object server may request the event agent that manages the information of target event(s) and influence event(s) corresponding to the target route to send a notification event list containing information of the target event(s) and influence event(s) of the target route.

At S668, the mobile object server may update the current location of the target moving object by the mobile object agent. In one embodiment, the mobile object agent for the target moving object updates the current location of the target moving object based on the position information of the car probe data.

At S669, the mobile object server may execute the mobile object agent for the target moving object to provide the target moving object with information that assists the target moving object with traveling in the geographic space based on the information included in the event list. In one embodiment, the mobile object agent may provide the target moving object with information of events on the notification event list.

In one embodiment, the at least one mobile object server may execute the mobile object agent for the target moving object to provide the target moving object with information that assists the target moving object with traveling in the geographic space based on the information of the at least one passenger of the target moving object. For example, the mobile object agent may provide the target moving object with an alert, a notice, and/or an action list relating events on the notification event list depending on a number of passengers (e.g., for guiding a car pool lane), the age, gender, license, real time information (e.g., driving history or sleep history), and characteristics of the passengers.

The action list is a list of actions recommended to passengers in response to the events (e.g., braking, accelerating, and/or steering of the target moving object).

The action list may include commands to the target moving object for automatic driving and/or driving assist. In one embodiment, the mobile object agent may include information that the passenger is sensitive to rough driving, and then the mobile object agent may provide commands to gently drive the target moving object. In one embodiment, the mobile object agent may include information of driving skill of a driver passenger, and then provide different commands depending on the skill of the driver. The mobile object server may provide the target moving object with the information via the gateway apparatus.

As described above, the mobile object server receives information from the target moving object in the region assigned to the mobile object server, and generates the mobile object agent for the target moving object if there is no mobile object server among the plurality of mobile object servers that is executing the mobile object agent.

Figure 14:
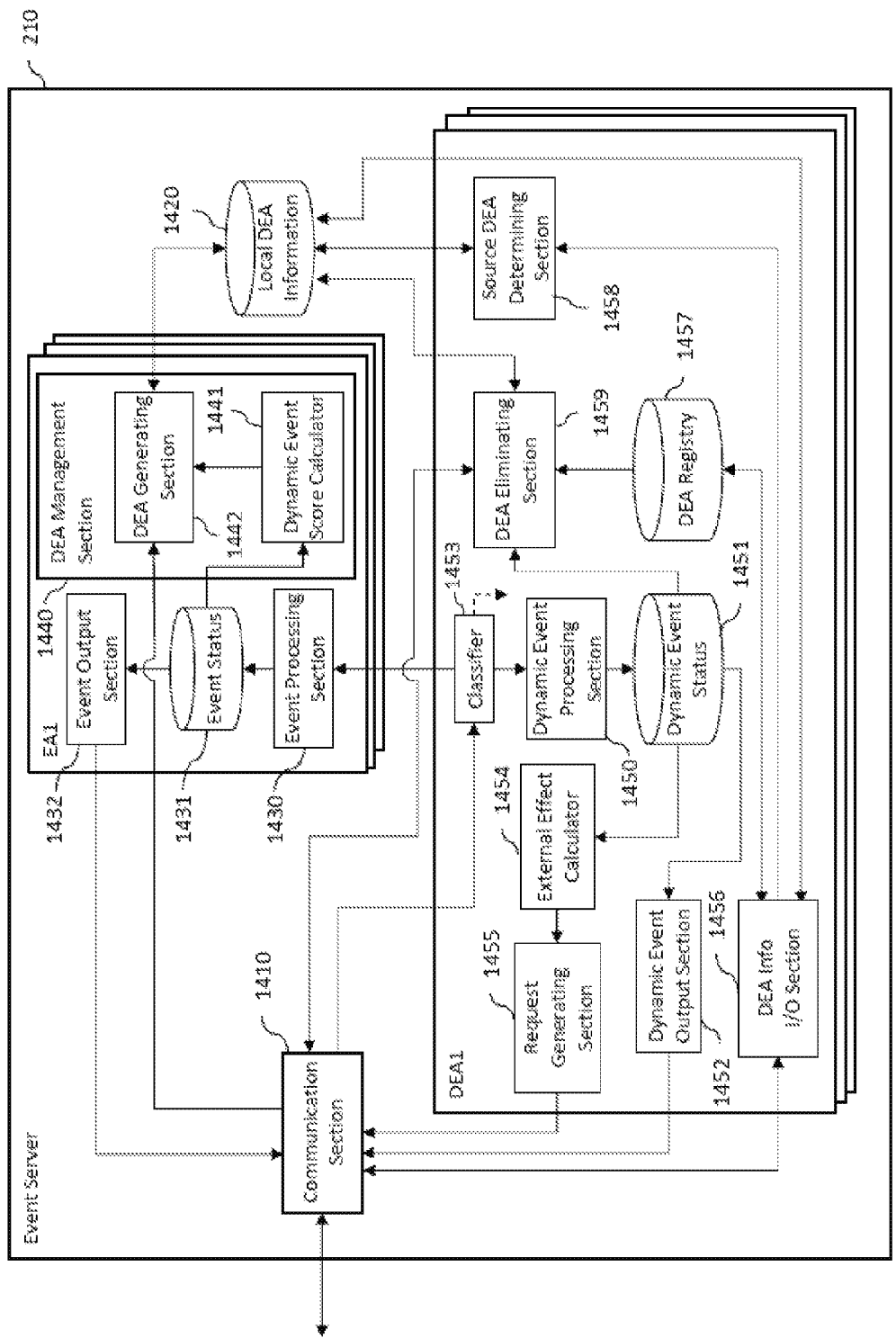
FIG. 14 shows an event server 210 of the system 100 according to an embodiment of the present invention.

FIG. 14 shows an event server 210 of the system 100 according to an embodiment of the present invention. The event server 210 may be an event server of the subsystem 200 shown in FIG. 3 and may manage events in region A as shown in FIG. 2. In addition to executing one or more event agents, such as the event agents EA1-EA16 shown in FIG. 2, the event server 210 generates and executes one or more dynamic event agents DEA1, DEA2, etc., each dedicated to handling a different dynamic event occurring in region A. Like the event agents, the dynamic event agents may be software entities having specific data and operable to receive messages (e.g. commands) and return results. Also like the event agents, the dynamic event agents may transmit event information to a mobile object agent executed by a mobile object server 220 to be provided to a moving object 10 moving in region A. However, whereas the events handled by the event agents occur locally within an area of one of the regions of the geographic space and may be associated with influence events occurring in the same or nearby areas of the region as described above, a dynamic event is a large-scale event with the potential to affect a plurality of the regions. An example of a dynamic event may be a weather pattern, a fire, or a traffic condition caused by a vehicle collision, natural disaster, or other emergency situation. A dynamic event agent DEA1 generated by the event server 210 of a subsystem 200 assigned to region A handles a specific dynamic event occurring in region A and issues requests to event servers 210 of subsystems 200 assigned to nearby regions to generate dynamic event agents to handle the same dynamic event in those nearby regions. The dynamic event agents of different subsystems 200 communicate with each other to manage the same dynamic event.

The event server 210 of FIG. 14 is depicted in a state in which one or more dynamic event agents DEA1, DEA2, etc. have been generated by one or more event agents executed by the event server 210. (In a state in which no dynamic event agents have been generated, the dynamic even agent(s) DEA1 DEA2, etc. would not exist.) The event server 210 of FIG. 14 includes a communication section 1410, a local DEA information storage 1420, one or more event agent(s) EA1, EA2, etc., and one or more dynamic event agent(s) DEA1, DEA2, etc.

The communication section 1410 receives the various outputs of the event agent(s) EA1, EA2, etc. and the dynamic event agent(s) DEA1, DEA2, etc. and outputs them from the event server 210. For example, the communication section 1410 may receive event information from the event agent(s) EA1, EA2, etc. and from the dynamic event agent(s) DEA1, DEA2, etc. and output the event information to the mobile object server 220 (see FIG. 3). The communication section 1410 further receives, from outside the event server 210, the various inputs of the event agent(s) EA1, EA2, etc. and the dynamic event agent(s) DEA1, DEA2, etc. and inputs them to the event agent(s) EA1, EA2, etc. and the dynamic event agent(s) DEA1, DEA2, etc. For example, the communication section 1410 may receive car probe data transmitted to the event server 210 via the gateway apparatus 160 by a moving object 10 traveling in region A. The communication section 1410 may also transmit various information, requests, notifications, etc. between the dynamic event agents and event agents of different subsystems 200.

The local DEA information storage 1420 stores information about dynamic event agents currently in existence within the subsystem 200. By consulting the local DEA information storage 1420, it can be determined whether a given dynamic event is currently managed by a dynamic event agent of the subsystem 200.

The event agent(s) EA1, EA2, etc. manage events in the region to which the event server 210 is assigned. Each of the event agent(s) EA1, EA2, etc. includes an event processing section 1430, an event status storage 1431, an event output section 1432, and a DEA management section 1440.

The event processing section 1430 processes received information such as car probe data from a moving object 10 traveling in region A and/or information from other sources, such as traffic information centers, weather centers, etc. according to a rule for creating an event. The car probe data may include event information observed by the moving object 10 (e.g., occurrence of ABS, detection of obstacles, or the like). In this way, the event processing section 1430 produces event information about an event to be handled by the event agent EA1. For example, if received car probe data indicates that ABS occurrence was observed by many cars in the same place, the road may be considered slippery and an event for handling a slippery road may be created. The event processing section 1430 may also modify event information of a created event, e.g. to change its location or range, or remove an event, based on new received information.

The event status storage 1431 of the event agent EA1 stores event information about events handled by the event agent EA1. For example, the event status storage 1431 may store event information created by the event processing section 1430, and the contents of the event status storage 1431 may later be modified by the event processing section 1430. The event status storage 1431 may store the event information in the form of an event list like the event list shown in FIG. 9.

The event output section 1432 outputs event information about events handled by the event agent to the communication section 1410 to be output to the mobile object server 220. The mobile object server 220 may use the event information to assist mobile objects with moving in the geographic space. For example, the mobile object server 220 may execute a mobile object agent and the mobile object agent may calculate a route to a destination designated by a passenger of the mobile object. When calculating a route, a route (edge) having an event such as traffic can be avoided or detoured. As another example, the event output section 1432 may output a notification event list for a target moving object as described with respect to step S667 of FIG. 13.

The DEA management section 1440 manages the generation of dynamic event agents to be executed by the event server 210. The DEA management section 1440 includes a dynamic event score calculator 1441 and a DEA generating section 1442.

The dynamic event score calculator 1441 receives information suggestive of a dynamic event and calculates a dynamic event scored based on the received information. For example, the received information may be event information stored in the event status storage 1431. The dynamic event score may be a value indicative of the necessity of generating a dynamic event agent to handle the dynamic event suggested by the event information.

The DEA generating section 1442 generates a dynamic event agent for handling a dynamic event occurring in the region to which the subsystem 200 is assigned, for example, by allotting system resources to a software entity dedicated to managing the particular dynamic event. For example, the event server 210 may execute an object-oriented program for a dynamic event agent and create an instance, such as DEA1, of an object for the dynamic event agent. The DEA generating section 1442 may generate the dynamic event agent if an event handled by the event agent is predicted to spread to a region next to the region to which the event server 210 is assigned. The DEA generating section 1442 may determine whether to generate a dynamic event agent on the basis of the dynamic event score calculated by the dynamic event score calculator 1441 and the information stored in the local DEA information storage 1420. For example, the DEA generating section 1442 may generate a dynamic event agent when the dynamic event score exceeds a threshold value and no DEA handling the same dynamic event exists in the subsystem 200. Upon generation of a dynamic event agent, the DEA generating section 1442 may assign the dynamic event to the dynamic event agent and update the local DEA information storage 1420 to reflect the newly generated dynamic event agent.

In some cases, the DEA generating section 1442 may generate the dynamic event agent before occurrence of the dynamic event based on statistical information about occurrence of events in the region. For example, by comparing one or more events stored in the event status storage 1431 with known statistical information, the DEA generating section 1442 may predict the occurrence of a dynamic event. For example, if weather events highly correlated with an imminent severe weather condition like a storm appear in the event status storage 1431, the DEA generating section 1442 may generate a dynamic event agent to handle the storm before the storm itself occurs. As another example, if statistical information indicates that a vehicle collision is likely to occur in the region during a certain time of day (e.g. rush hour), the DEA generating section 1442 may generate a dynamic event agent for handling a collision before the collision occurs.

Each of the dynamic event agent(s) DEA1, DEA2, etc. includes a dynamic event processing section 1450, a dynamic event status storage 1451, a dynamic event output section 1452, a classifier 1453, an external effect calculator 1454, a request generating section 1455, a DEA info I/O section 1456, a DEA registry 1457, a source DEA determining section 1458, and a DEA eliminating section 1459.

The dynamic event processing section 1450 processes received information such as car probe data from a moving object 10 traveling in region A and/or information from other sources, such as traffic information centers, weather centers, etc. according to a rule for creating dynamic event content of the dynamic event handled by the dynamic event agent. In this way, the dynamic event processing section 1450 produces dynamic event information about the dynamic event. For example, in the case of a dynamic event agent handling a severe weather condition like a storm as the dynamic event, the content of the dynamic event may include slippery roads. In this case, upon receiving car probe data indicating that ABS occurrence was observed by many cars in the same place, the dynamic event processing section 1450 may consider a new road to be slippery and produce new dynamic event content for the dynamic event. The dynamic event processing section 1450 may also modify dynamic event information of an already-created item of dynamic event content, e.g. to change its location or range, or remove dynamic event content, based on new received information.

When producing dynamic event content for the dynamic event, the dynamic event processing section 1450 may estimate traffic congestion of a vehicle route in the region caused by the dynamic event based on already-created dynamic event content and/or new received information. For example, the dynamic event processing section 1450 may estimate traffic congestion by comparing already-created dynamic event information and/or new received information with information about the positional relationships and connection states of roads. In this way, the dynamic event content produced by the dynamic event processing section 1450 may include estimated traffic congestion of vehicle routes in the region caused by the dynamic event.

The dynamic event status storage 1451 stores dynamic event information about the dynamic event handled by the dynamic event agent. For example, the dynamic event status storage 1451 may store dynamic event information created by the dynamic event processing section 1450, and the contents of the event status storage 1451 may later be modified by the event processing section 1450. The dynamic event status storage 1451 may store information about the dynamic event similar to the event information in the event list shown in FIG. 9 except that i) all items of dynamic event content relate to a single dynamic event and ii) the information covers all affected areas of the region (and thus there are no influence events).

The dynamic event output section 1452 outputs dynamic event information about the dynamic event handled by the dynamic event agent to the communication section 1410 to be output to the mobile object server 220. The mobile object server 220 may use the dynamic event information to assist mobile objects with moving in the geographic space. For example, the mobile object server 220 may execute a mobile object agent and the mobile object agent may calculate a route to a destination designated by a passenger of the mobile object. When calculating a route, a route (edge) having dynamic event content such as traffic can be avoided or detoured. As another example, the dynamic event output section 1452 may output, based on the contents of the dynamic event status storage 1451, a notification event list for a target moving object in the same way as described with respect to step S667 of FIG. 13. Accordingly, the mobile object server 220 may transmit a signal based on information about the dynamic event to a mobile object in the region to which the subsystem 200 is assigned. Since the dynamic event status storage 1451 may include estimated traffic congestion of a vehicle route in the region caused by the dynamic event, the mobile object server 220 may transmit a signal including information about the estimated traffic congestion to a mobile object in the region to which the subsystem 200 is assigned.

The classifier 1453 receives information relating to an event from a mobile object in the first region or other source via the communication section 1410 and determines whether the received information relates to the dynamic event. The information may be, for example, car probe data that would otherwise be received by one of the event server(s) EA1, EA2, etc. if not for the existence of one or more dynamic event agents. If the classifier 1453 determines that the received information relates to the dynamic event handled by the dynamic event agent to which the classifier 1453 belongs, the classifier 1453 forwards the received information to the dynamic event processing section 1450, which then updates the dynamic event status storage 1451 to reflect any update to the status of the dynamic event based on the received information. If, on the other hand, the classifier 1453 determines that the received information relates to an event other than the dynamic event, the classifier 1453 forwards the received information to an event agent so that the event processing section 1430 can update the status of an event in the event status storage 1431. In this way, updates to existing dynamic events can be made without creating redundant event records in the event server 210.

When the received information relates to an event other than the dynamic event, instead of forwarding the received information to an event agent, the classifier 1453 may forward the received information to a second dynamic event agent to undergo a determination by a second classifier 1453. (The dashed downward arrow in FIG. 14 represents a path for the forwarding of received information from the classifier 1453 of DEA1 to the classifier 1453 of DEA2.) The dynamic event agents DEA1, DEA2, etc. may be arranged in a "chain" such that received information that is found not to relate to the dynamic event of DEA1 is forwarded to DEA2, received information that is found not to relate to the dynamic event of DEA2 is forwarded to DEA3 and so on. Only when the classifier 1453 of the last dynamic event agent determines that the received information does not relate to its dynamic event is the received information forwarded to an event agent to be processed by the event processing section 1430.

The external effect calculator 1454 calculates a probability that a nearby region will be affected by the dynamic event. For example, the external effect calculator 1454 may monitor the contents of the dynamic event status storage 1451 and keep a running probability for each of a plurality of nearby regions, such as the regions next to the region assigned to the subsystem 200. As the dynamic event status storage 1451 is updated by the dynamic event processing section 1450 based on, for example, car probe data, the external effect calculator 1454 may update the probabilities.

The external effect calculator 1454 may calculate and update the probability using an algorithm specific to the dynamic event assigned to the dynamic event agent to which the external effect calculator 1454 belongs. For example, a dynamic event agent that handles a weather pattern such as a hurricane may calculate the probability that a nearby region will be affected on the basis of local weather conditions and weather forecasts. As another example, a dynamic event agent that handles a fire may calculate the probability that a nearby region will be affected on the basis of information about the materials and arrangements of buildings and weather conditions such as wind and rain. As yet another example, a dynamic event agent that handles a traffic condition caused by a vehicle collision, natural disaster, or other emergency situation may calculate the probability that a nearby region will be affected on the basis of positional relationships and connection states of roads. For example, since the dynamic event status storage 1451 may include estimated traffic congestion of a vehicle route in the region caused by the dynamic event, the external effect calculator 1454 may calculate the probability that a nearby region will be affected by the traffic condition based on the estimated traffic congestion.

The request generating section 1455 issues a request to a nearby subsystem 200 causing an event server 210 of the nearby subsystem 200 to generate a dynamic event agent for handling the same dynamic event handled by the subsystem 200 to which the request generating section 1455 belongs. For example, the request generating section 1455 of the subsystem 200 assigned to region A may issue a request to the subsystem assigned to region B (next to region A) if the probability calculated by the external effect calculator 1454 for region B exceeds a threshold value. The issued request may be transmitted to the subsystem assigned to region B via the communication section 1410.

The DEA info I/O section 1456 sends and receives information about dynamic event agents via the communication section 1410. For example, the DEA info I/O section 1456 may send information stored in the local DEA information storage 1420 to a different subsystem 200. Conversely, information received by the DEA info I/O section 1456 from a different subsystem 200 may be stored in the local DEA information storage 1420.

The DEA registry 1457 is a list, maintained by the dynamic event agent, of all other dynamic event agents that have been generated for handling the dynamic event handled by that dynamic event agent. The contents of the DEA registry 1457 may be updated by the DEA info I/O section when the DEA info I/O section receives information about other dynamic event agents.

The source DEA determining section 1458 determines which dynamic event agent is the source DEA, i.e. the dynamic event agent handling the dynamic event in the region where the dynamic event originated. As more information is obtained about a dynamic event, it may be found that the initially determined region where the dynamic event was thought to have originated is incorrect, or that the dynamic event could be handled more efficiently if the source DEA were different. In such a case, the DEA determining section 1458 may determine or re-determine the source DEA, for example, by comparing generation timestamps of candidate source DEAs or by comparing the importance of the candidate source DEAs in managing the dynamic event, for example, with reference to values indicating the severity or influence of the dynamic event in the regions handled by the candidate source DEAs.

The eliminating section 1459 eliminates the dynamic event agent to which it belongs. For example, the eliminating section 1459 of a dynamic event agent that is not the source DEA may eliminate the dynamic event agent (including itself) based on i) whether or not the dynamic event is still occurring in the region and ii) notification from other dynamic event agents about whether or not the dynamic event is still occurring in other regions. In this way, each dynamic event agent can manage its own lifecycle up to its own elimination.

Figure 15:
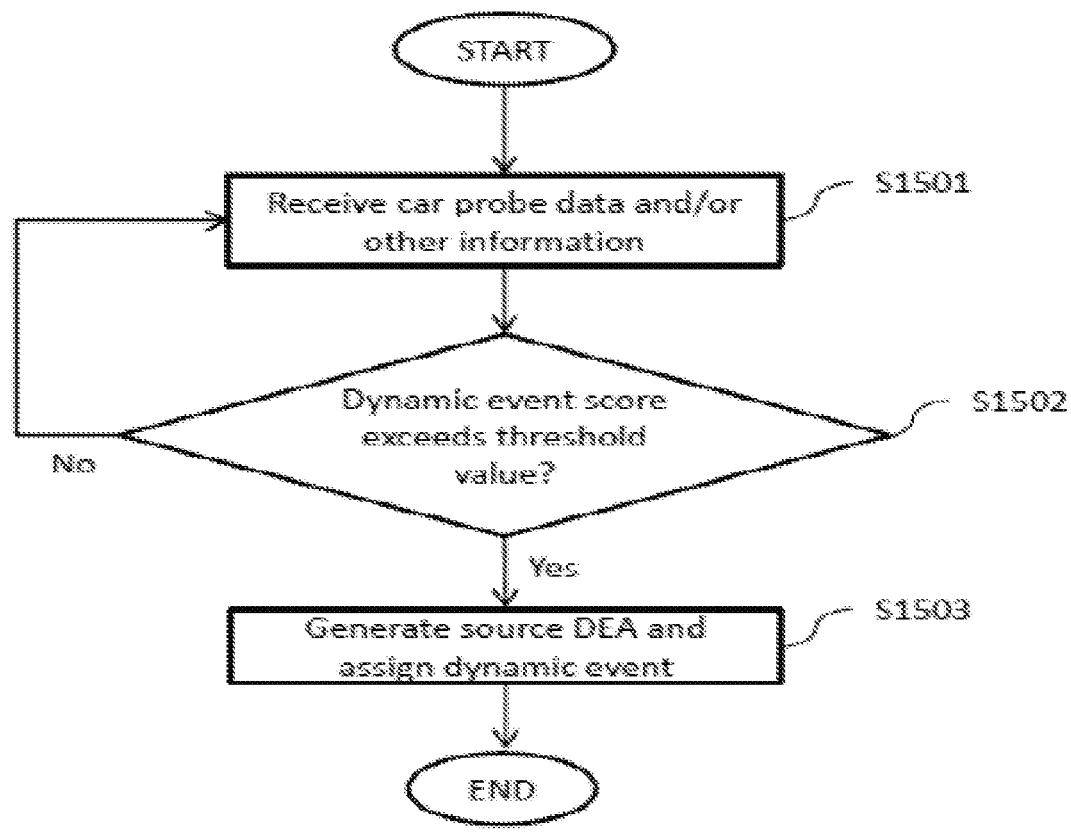
FIG. 15 shows an example operational flow of the event server 210 shown in FIG. 14 according to an embodiment of the present invention.

FIG. 15 shows an example operational flow of the event server 210 shown in FIG. 14 according to an embodiment of the present invention. In the example shown in FIG. 15, the event server 210 performs the operations from S1501 to S1503, but the event server 210 shown in FIG. 14 is not limited to using this operational flow. Also, the operational flow in FIG. 15 may be performed by a modified server or a different server that differs from the event server 210 shown in FIG. 14.

First, the event server 210 receives car probe data and/or other information related to events in the region to which the subsystem 200 is assigned (S1501), for example, via the communication section 1410. If one or more dynamic event agents have already been generated, the received information may be forwarded to the event processing section 1430 of an event agent EA1 by the classifier 1453 of a dynamic event agent. On the other hand, if no dynamic event agents are yet in existence, the received information may be forwarded directly from the communication section 1410 to the event processing section 1430 of the event agent EA1. In either case, the event processing section 1430 analyzes the information and, in accordance with a rule, creates an event or updates an existing event in the event status storage 1431 or ignores the received information. The dynamic event score calculator 1441 of the DEA management section 1440 of the event agent EA1 may monitor the contents of the event status storage 1431 or otherwise receive event information stored in the event status storage 1431.

Such event information may be suggestive of the existence of a dynamic event within region A. The dynamic event score calculator 1441 may calculate a dynamic event score indicative of the necessity of generating a dynamic event agent to handle the dynamic event. For example, the dynamic event score calculator 1441 may keep a running dynamic event score and update it as the contents of the event status storage 1431 are updated. The dynamic event score may be increased if there are a large number of related or similar events in the event status storage 1431, which could indicate that the separate events are actually one large-scale event or that they are likely to spread to a nearby region. The dynamic event score may be increased further if the events are near a border of region A. The dynamic event score may be decreased if the number of related or similar events in the event storage 1431 goes down due to events ending. The dynamic event score may also be increased if particular types of events appear in the event status storage 1431. For example, if a reported vehicle collision appears in the event status storage 1431, the dynamic event score calculator 1441 may increase the dynamic event score by a predetermined amount under the assumption that a vehicle collision is always a large-scale event.

Next, the event server 210 determines whether a dynamic event score indicative of the necessity of generating a dynamic event agent exceeds a threshold value (S1502). For example, the DEA generating section 1442 of the DEA management section 1440 may compare a dynamic event score calculated by the dynamic event score calculator 1441 to a threshold value. If the dynamic event score exceeds the threshold, the operational flow of FIG. 15 proceeds to step S1503, and if not, the operational flow returns to step S1501 and the event server 210 awaits more information.

Lastly, if it has been determined that the dynamic event score exceeds the threshold value in step S1502, the event server 210 generates a dynamic event agent and assigns the dynamic event suggested by the received information to the new dynamic event agent (S1503). For example, the DEA generating section 1442 of the event server 210 may generate the new dynamic event agent and update the contents of the local DEA information storage 1420 to reflect the existence of the new dynamic event agent. The new dynamic event agent is initially presumed to be the source DEA for the dynamic event, i.e. the dynamic event agent of the region where the dynamic event originated.

Figure 16:
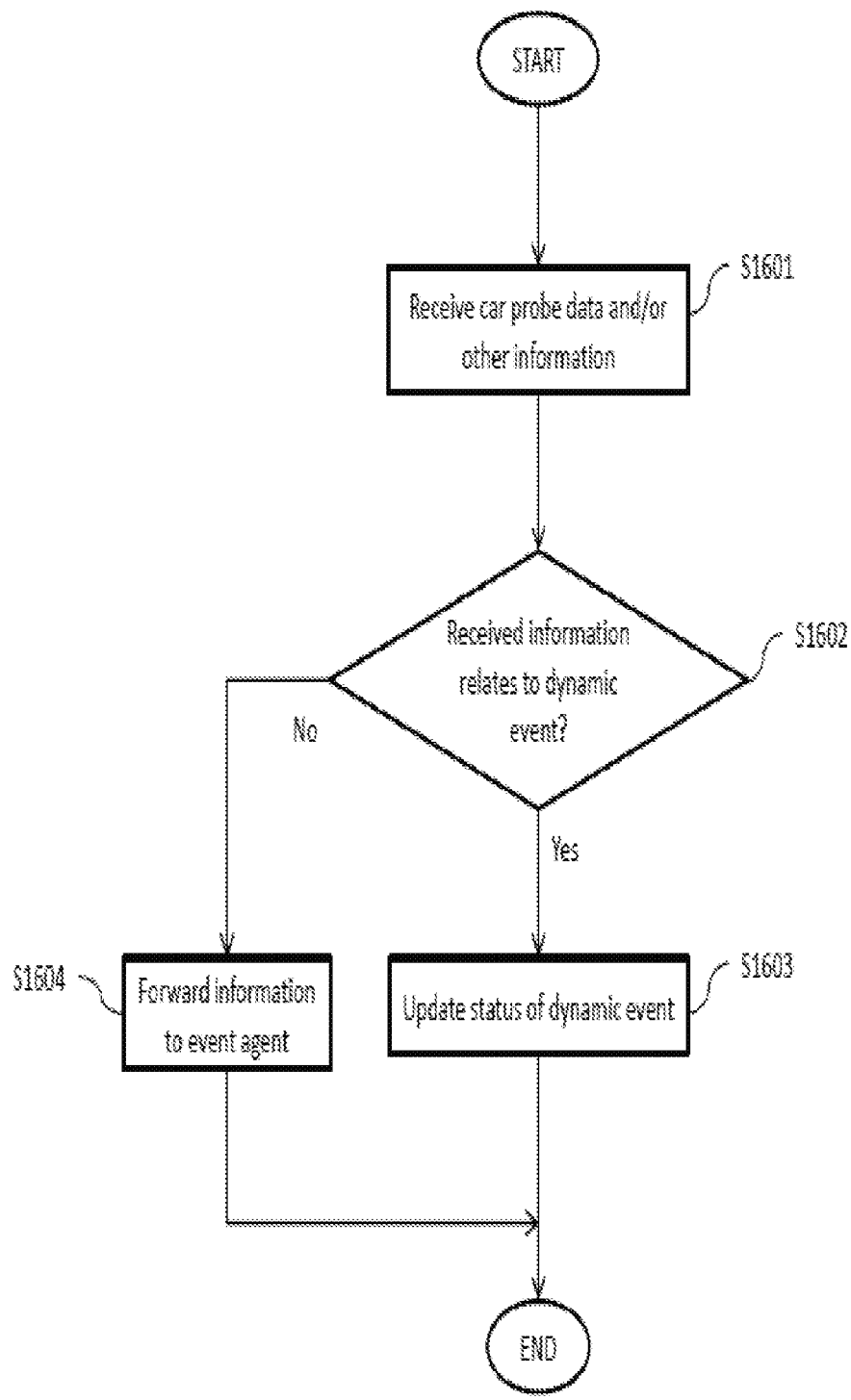
FIG. 16 shows an example operational flow of a dynamic event agent executed by the event server 210 shown in FIG. 14 according to an embodiment of the present invention.

FIG. 16 shows an example operational flow of a dynamic event agent executed by the event server 210 shown in FIG. 14 according to an embodiment of the present invention. In the example shown in FIG. 16, the event server 210 executes dynamic event agent DEA1 to perform the operations from S1601 to S1604, but the event server 210 and dynamic event agent shown in FIG. 14 are not limited to using this operational flow. Also, the operational flow in FIG. 16 may be performed by a modified server/agent or a different server/agent that differs from the event server 210 and DEA1 shown in FIG. 14.

First, DEA1 receives car probe data and/or other information related to events in the region to which the subsystem 200 is assigned (S1601). For example, the classifier 1453 of DEA1 may receive, via the communication section 1410, car probe data from a moving object 10 traveling in region A and/or information originating from other sources, such as traffic information centers, weather centers, etc. The car probe data may include event information observed by the moving object 10 (e.g., occurrence of ABS, detection of obstacles, or the like).

Next, DEA1 determines whether the received information relates to the dynamic event assigned to DEA1 (S1602). For example, the classifier 1453 of DEA1 may determine whether the received information relates to the dynamic event assigned to DEA1 based on information stored in the classifier 1453 at the time DEA1 is generated, such as information about the type of dynamic event assigned to DEA1 and/or the generation timestamp of DEA1. If it is determined that the received information relates to the dynamic event assigned to DEA1, the operational flow of FIG. 16 proceeds to step S1603. If not, the operational flow proceeds to step S1604.

If it was determined that the received information relates to the dynamic event agent assigned to DEA1, DEA1 updates the status of the dynamic event (S1603). For example, the classifier 1453 of DEA1-1 may provide the received information to the dynamic event processing section 1450, which may then update the contents of the dynamic event status storage 1451, such as by adding a new dynamic event content entry representing a new location within region A affected by the dynamic event.

If, on the other hand, it was determined that the received information does not relate to the dynamic event assigned to DEA1, DEA1 forwards the received information to an event agent of the event server 210 (S1604). For example, the classifier 1453 of DEA1 may forward the received information to event agent EA1 of the event server 210 to be processed by the event processing section 1430. Step S1604 may be modified as described above in the case of "chained" dynamic event agents. Namely, in step S1604, the classifier 1453 may forward the received information to EA1 if it is the classifier 1453 of the last dynamic event agent in a chain and may otherwise forward the received information to the classifier 1453 of the next dynamic event agent in the chain.

Figure 17:
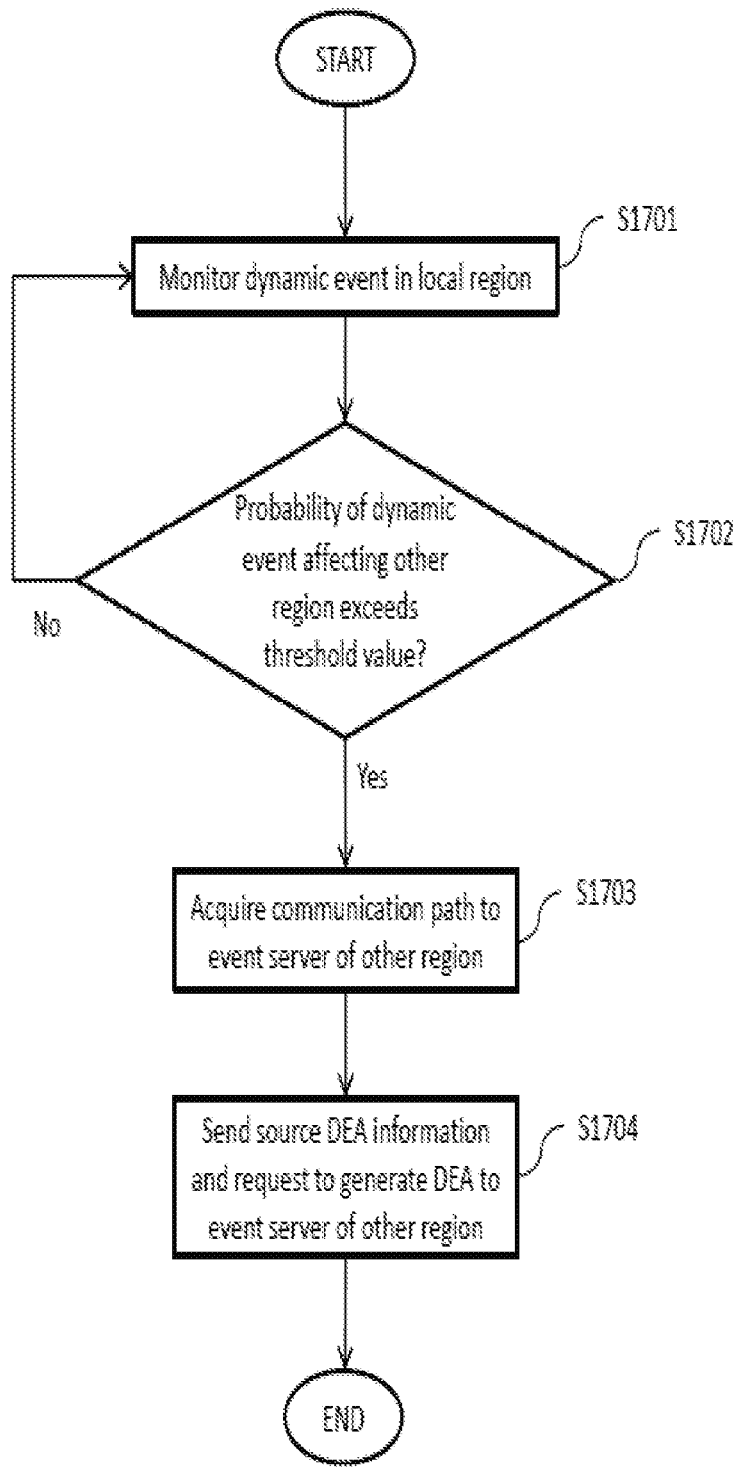
FIG. 17 shows an example operational flow of a dynamic event agent executed by the event server 210 shown in FIG. 14 according to an embodiment of the present invention.

FIG. 17 shows an example operational flow of a dynamic event agent executed by the event server 210 shown in FIG. 14 according to an embodiment of the present invention. In the example shown in FIG. 17, the event server 210 executes the dynamic event agent DEA1 to perform the operations from S1701 to S1704, but the event server 210 and dynamic event agent shown in FIG. 14 are not limited to using this operational flow. Also, the operational flow in FIG. 17 may be performed by a modified server/agent or a different server/agent that differs from the event server 210 and DEA1 shown in FIG. 14.

First, DEA1 monitors the dynamic event in the region to which the event server 210 is assigned (S1701) and determines whether the probability of the dynamic event handled by DEA1 affecting other regions exceeds a threshold value (S1702). For example, the external effect calculator 1454 of DEA1 may monitor the contents of the dynamic event status storage 1451 and calculate and update the probability that the dynamic event will affect nearby region B using an algorithm specific to the dynamic event assigned to DEA1 as described above. If the probability exceeds a threshold value, the operational flow of FIG. 17 proceeds to step S1703. If not, the operational flow returns to step S1701.

If the probability exceeds the threshold value, DEA1 acquires a communication path to the subsystem assigned to region B (S1703) and sends a dynamic event agent generation request to the subsystem assigned to region B, along with information about the source DEA of the dynamic event (S1704). For example, the request generating section 1455 of DEA1 may issue the request and the DEA info I/O section 1456 of DEA1 may transmit the source DEA information by reading it from the local DEA information storage 1420. The request indicates what the dynamic event is (e.g.

hurricane), and a dynamic event ID unique to the dynamic event. The source DEA information includes which dynamic event agent is the source DEA for the dynamic event, i.e. the dynamic event agent of the region where the dynamic event originated, as well as the timestamp of the source DEA. If DEA1 was generated on the basis of a dynamic event score in accordance with the operational flow shown in FIG. 15, then DEA1 is initially presumed to be the source DEA, which will be indicated in the contents of the local DEA information storage 1420 unless the source DEA has been re-determined. On the other hand, if DEA1 was generated on the basis of a request from a dynamic event agent of another region, then DEA1 will typically not be the source DEA and a different source DEA will be indicated in the contents of the local DEA information storage 1420. In any case, the DEA info I/O section 1456 of DEA1 transmits the source DEA information for the dynamic event so that the event server 210 of the recipient subsystem of the dynamic event agent generation request can learn the source DEA and record the information in its own local DEA information storage 1420.

In the example described above with respect to FIG. 17 and FIG. 14, the DEA info I/O section 1456 of DEA1 transmits the source DEA information by reading it from the local DEA information storage 1420 while the request generating section 1455 transmits the request. However, as an alternative, the request generating section 1455 may include the source DEA information in the request by reading it from the local DEA information storage 1420.

Figure 18:
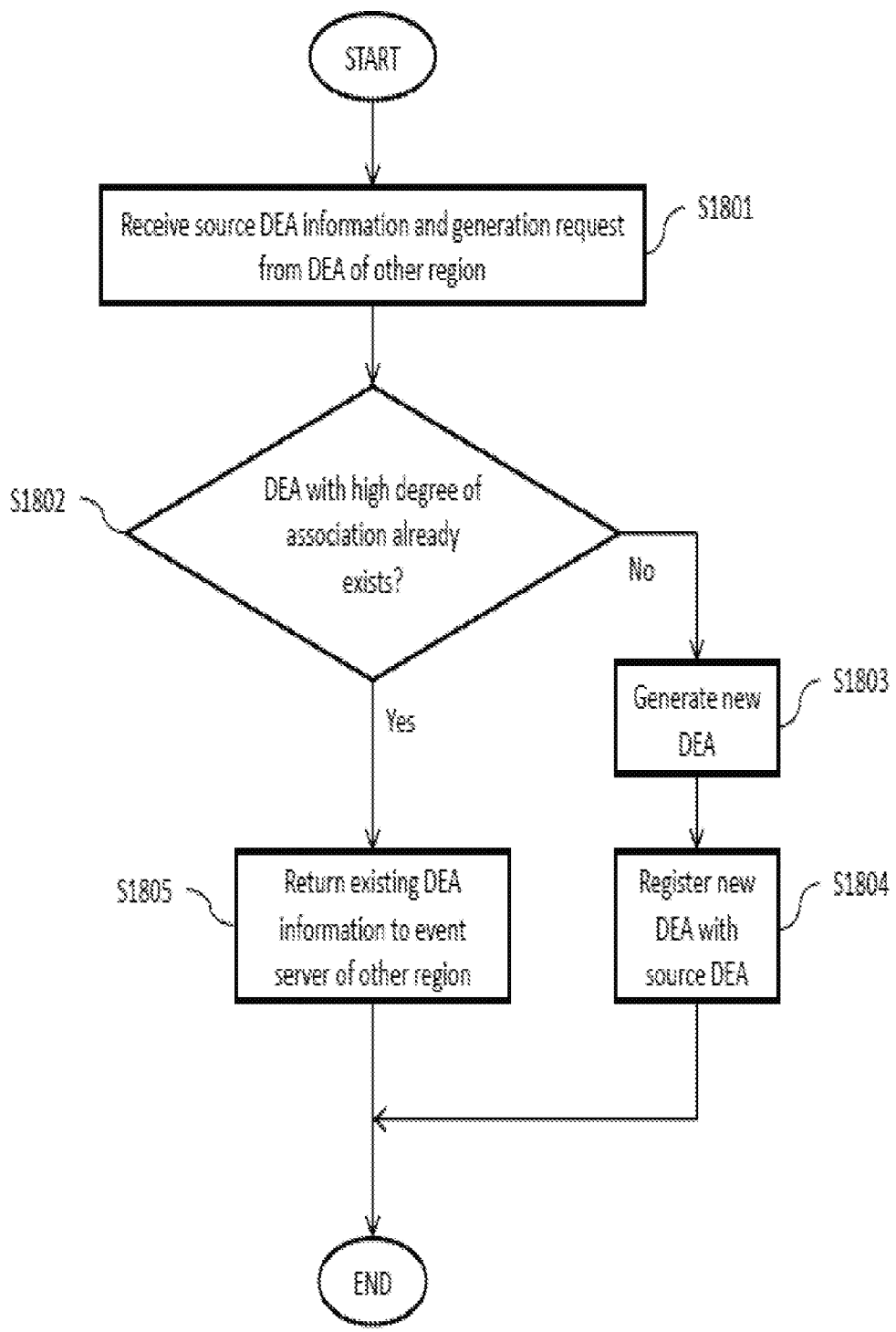
FIG. 18 shows an example operational flow of the event server 210 shown in FIG. 14 according to an embodiment of the present invention.

FIG. 18 shows an example operational flow of the event server 210 shown in FIG. 14 according to an embodiment of the present invention. In the example shown in FIG. 18, the event server 210 performs the operations from S1801 to S1805, but the event server 210 shown in FIG. 14 is not limited to using this operational flow. Also, the operational flow in FIG. 18 may be performed by a modified server or a different server that differs from the event server 210 shown in FIG. 14.

First, the event server 210 receives a dynamic event agent generation request and accompanying source DEA information from an event server 210 of another region (S1801). For example, the DEA generating section 1442 of the DEA management section 1440 of an event agent EA1A (final "A" signifying region A for the purpose of this description) executed by the event server 210 in the subsystem 200 assigned to region A may receive, via the communication section 1410, the dynamic event agent generation request and accompanying source DEA information from a dynamic event server DEA1B executed by an event server 210 in the subsystem 200 assigned to region B (next to region A). The transmitting of the request and source DEA information from DEA1B may be the result of DEA1B performing the operational flow of FIG. 17. In other words, it may have been determined that the dynamic event handled by DEA1B has a high probability of affecting region A.

Next, the event server 210 determines whether a dynamic event agent having a high degree of association with the dynamic event of the request already exists in the event server 210 (S1802). For example, the DEA generating section 1442 may consult the local DEA information storage 1420, which contains information of each existing local dynamic event agent, i.e. those within the event server 210 or subsystem 200 and assigned to the same region A. To determine the degree of association, the DEA generating section 1442 may, for example, compare the dynamic event of the request with the types of dynamic events handled by existing local dynamic event agents and the generation timestamps of those dynamic event agents. The DEA generating section 1442 may further compare the received DEA source information, including the timestamp of the source DEA, with the source DEA information stored in the local DEA information storage 1420. If it is determined that a dynamic event agent with a high degree of association already exists, the operational flow of FIG. 18 proceeds to step S1805. If not, the operational flow proceeds to step S1803.

If it is determined that a dynamic event agent with a high degree of association with the dynamic event of the request does not already exist in step S1802, the event server 210 generates a new dynamic event agent and assigns the dynamic event of the request to the new dynamic event agent (S1803). For example, the DEA generating section 1442 of the event server 210 may generate the new dynamic event agent and update the contents of the local DEA information storage 1420 to reflect the existence of the new dynamic event agent. The DEA generating section 1442 may store the source DEA information received with the request together with the information about the new dynamic event agent in the local DEA information storage 1420. Thus, the event server 210 generates the new dynamic event agent upon receipt of the request if a dynamic event agent for handling the dynamic event has not yet been generated by the subsystem of the event server 210.

Lastly, the event server 210 registers the new dynamic event agent with the source DEA (S1804). For example, upon the generation of the new dynamic event agent, the DEA info I/O section 1456 of the new dynamic event agent may read the source DEA information stored in the local DEA information storage 1420 and register the new dynamic event agent (e.g. DEA ID or address information unique to specific dynamic event agent of specific subsystem) with the source DEA indicated by the received source DEA information. The registration may be transmitted via the communication section 1410 to be stored in the DEA registry 1457 of the source DEA. The source DEA may be different from the dynamic event agent that sent the request and accompanying source DEA info. In this way, new dynamic event agents generated as a result of DEA generation requests are registered with the source DEA.

On the other hand, if it is determined that a dynamic event agent with a high degree of association with the dynamic event agent of the request already exists in step S1802, the event server 210 does not need to generate a new dynamic event agent and instead denies the request by returning information about the already-existing dynamic event agent (existing DEA information) and corresponding source DEA information to the event server 210 that sent the request (S1805). For example, upon discovering a dynamic event agent with a high degree of association in the local DEA information storage 1420, the DEA generating section 1442 may transmit information of the existing DEA (e.g. DEA ID or address information unique to specific dynamic event agent of specific subsystem) and information of the corresponding source DEA to the dynamic event agent that sent the denied request. The information may be transmitted via the communication section 1410 to the dynamic event agent that sent the denied request for further processing.

Figure 19:
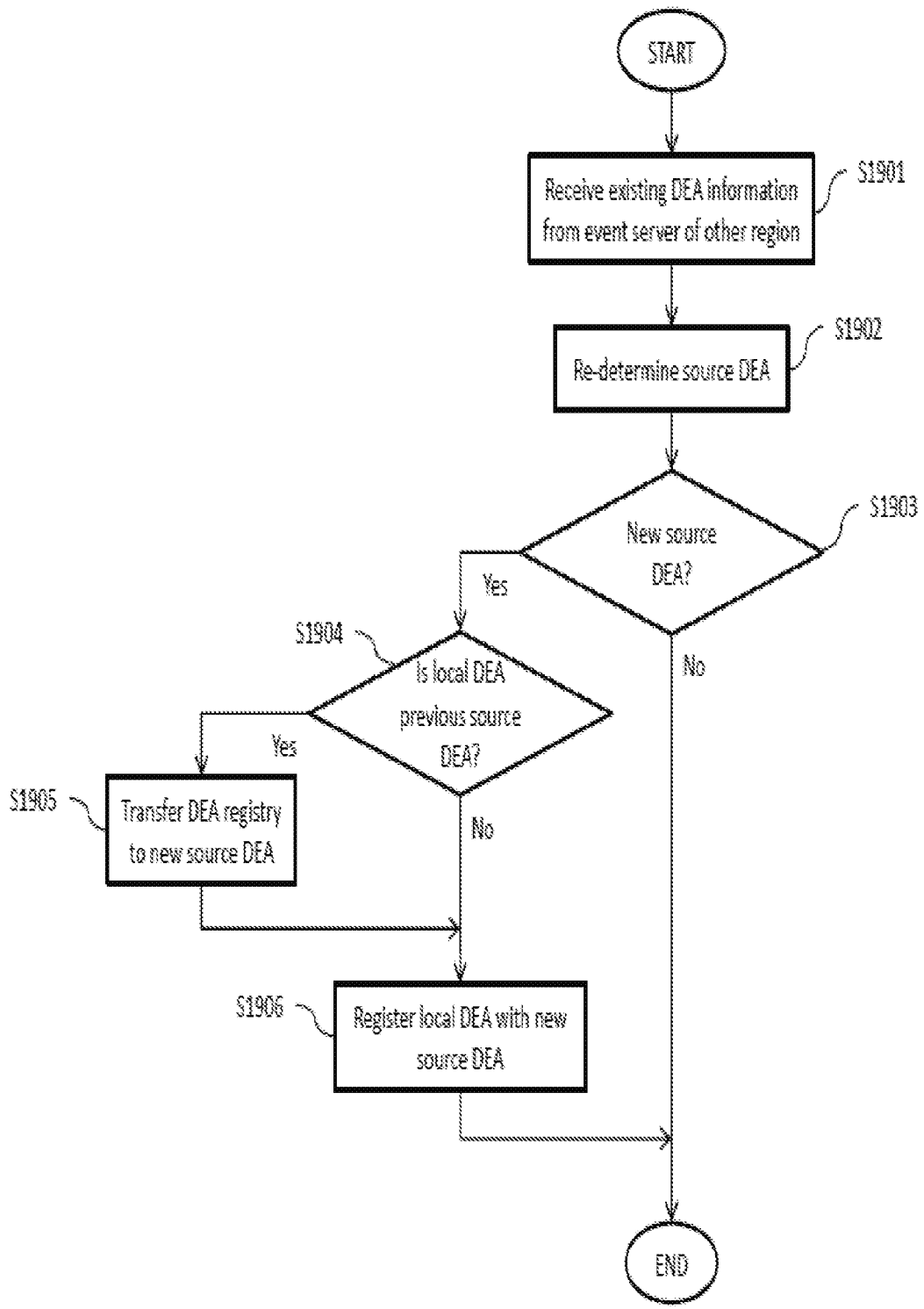
FIG. 19 shows an example operational flow of a dynamic event agent executed by the event server 210 shown in FIG. 14 according to an embodiment of the present invention.

FIG. 19 shows an example operational flow of a dynamic event agent executed by the event server 210 shown in FIG. 14 according to an embodiment of the present invention. In the example shown in FIG. 19, the event server 210 executes the dynamic event agent DEA1 to perform the operations from S1901 to S1906, but the event server 210 and dynamic event agent shown in FIG. 14 are not limited to using this operational flow. Also, the operational flow in FIG. 19 may be performed by a modified server/agent or a different server/agent that differs from the event server 210 and DEA1 shown in FIG. 14.

First, DEA1 receives existing DEA information from an event server 210 of another region (S1901). For example, the DEA info I/O section 1456 of DEA1A (executed by the event server 210 in the subsystem 200 assigned to region A) may receive, via the communication section 1410, information about an existing DEA1B handling the same dynamic event for the event server 210 in the subsystem 200 assigned to region B, along with associated source DEA info of DEA1B. The transmitting of the existing DEA information from DEA1B to DEA1A may be the result of DEA1B performing step S1805 of FIG. 18 (in response to DEA1B performing the operational flow of FIG. 17). In other words, after determining that the dynamic event handled by DEA1A has a high probability of affecting region B, DEA1A may have transmitted a DEA generation request to an event server 210 in the subsystem 200 assigned to region B. The event server 210 in the subsystem 200 assigned to region B may have denied the request because of the prior existence of DEA1B handling the same dynamic event and returned existing DEA information about DEA1B and associated source DEA info to DEA1A.

Next, DEA1A re-determines the source DEA of the dynamic event handled by DEA1A (S1902). For example, upon the receipt by DEA1A of existing DEA information from an event server 210 of another region, the source DEA determining section 1458 of DEA1A may determine whether the source DEA information stored in the local DEA information storage 1420 with respect to DEA1A should be changed to the dynamic event agent indicated by the source DEA information of the received existing DEA information. The received existing DEA information, including source DEA information, may, for example, be provided to the source DEA determining section 1458 by the DEA info I/O section 1456 upon receipt, and the source DEA determining section 1458 may compare the generation timestamp of the received information with that of the source DEA information stored in the local DEA information storage 1420. If the source DEA determining section 1458 determines that the source DEA should be updated, the source DEA determining section 1458 may update the contents of the local DEA information storage 1420 to reflect the updated source DEA.

Next, DEA1 determines whether the source DEA has been updated (S1903). If it is determined that the source DEA has been updated, DEA1A determines whether the local DEA (i.e. DEA1A) was the previous source DEA (S1904). For example, the DEA info I/O section 1456 of DEA1A may determine whether the source DEA has been updated and, if so, whether the local DEA was the previous source DEA, on the basis of a change in the source DEA information stored in the local DEA information storage 1420. If it is determined that the source DEA has been updated and that the local DEA was the previous source DEA in steps S1903 and S1904, it means that the local DEA (i.e. DEA1A) has been demoted from source DEA. Therefore, in this case, DEA1A, e.g. DEA info I/O section 1456, transfers the contents of the DEA registry 1457 (which is maintained only by the source DEA) to the new source DEA (S1905) and may delete the local copy of the contents from its own DEA registry 1457. If, on the other hand, it is determined that the source DEA has been updated and that the local DEA was not the previous source DEA in steps S1903 and S1904, then it means that DEA1A does not maintain the DEA registry 1457. Therefore, step S1905 is bypassed. In either case, as long as it is determined that the source DEA has been updated, the operational flow proceeds to step S1906.

Lastly, if it is determined that the source DEA has been updated, DEA1A registers itself with the new source DEA (S1906). For example, the DEA info I/O section 1456 may read the updated source DEA information stored in the local DEA information storage 1420 and register DEA1A (e.g. DEA ID or address information unique to specific dynamic event agent of specific subsystem) with the source DEA indicated by the updated source DEA information. The registration may be transmitted via the communication section 1410 to be stored or added in the DEA registry 1457 of the source DEA (whose other contents may also have been newly transferred to the source DEA in step S1905). In this way, when a new source DEA is determined, the dynamic event agents communicate to appropriately reestablish the DEA registry 1457 and reduce duplicate copies of registry contents.

In the above example operational flows of FIGS. 17-19, the determination or re-determination of the source DEA is only shown as occurring at step S1902, after a dynamic event agent that sent a generation request receives existing DEA information from the recipient of the request. However, the determination or re-determination of the source DEA is not limited to this situation and may occur any time a dynamic event agent receives DEA information from another subsystem for any reason, including when a dynamic event agent receives DEA information along with a generation request, e.g. after step S1801 in FIG. 18.

Figure 20:
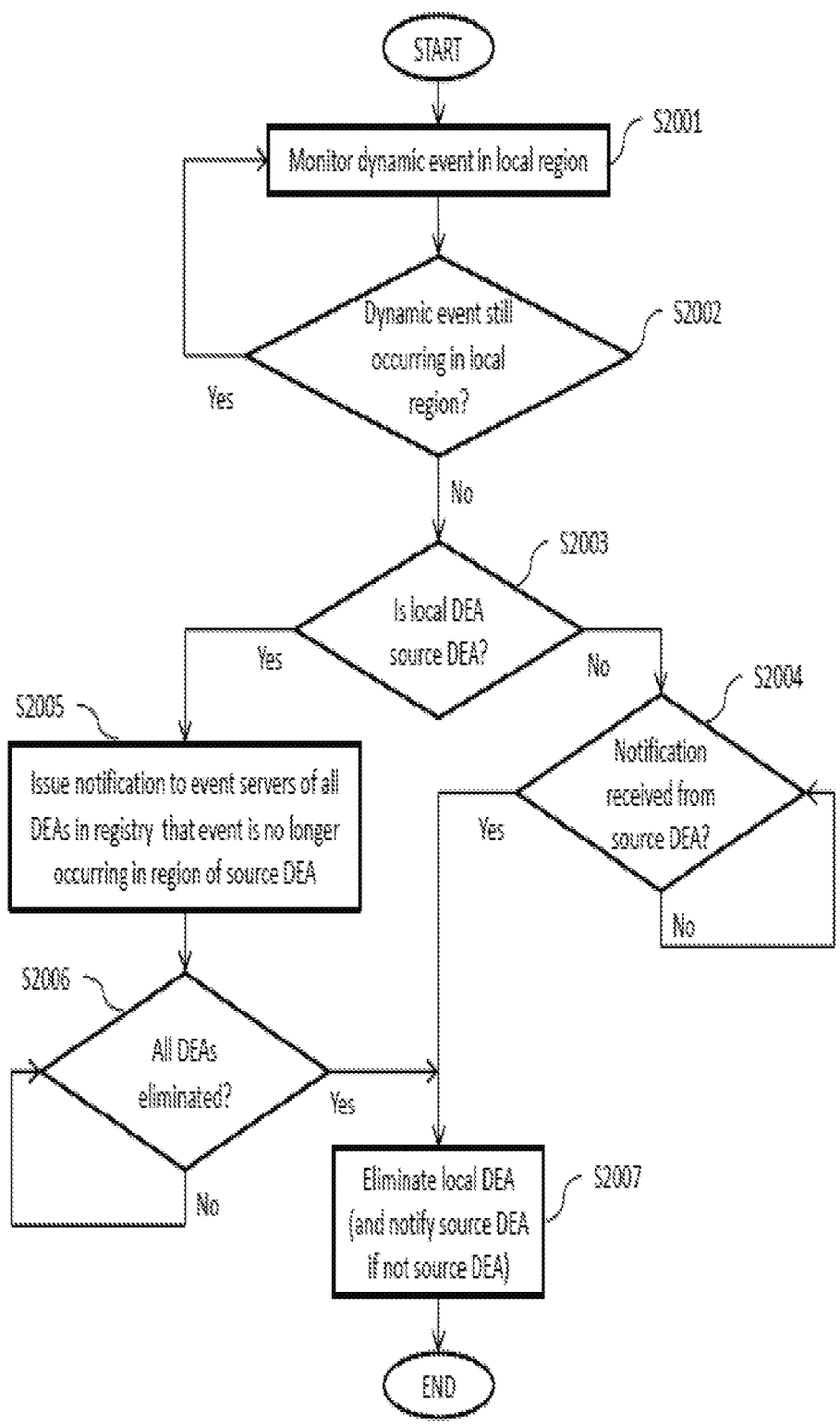
FIG. 20 shows an example operational flow of a dynamic event agent executed by the event server 210 shown in FIG. 14 according to an embodiment of the present invention.

FIG. 20 shows an example operational flow of a dynamic event agent executed by the event server 210 shown in FIG. 14 according to an embodiment of the present invention. In the example shown in FIG. 20, the event server 210 executes the dynamic event agent DEA1 to perform the operations from S2001 to S2007, but the event server 210 and dynamic event agent shown in FIG. 14 are not limited to using this operational flow. Also, the operational flow in FIG. 20 may be performed by a modified server/agent or a different server/agent that differs from the event server 210 and DEA1 shown in FIG. 14.

First, DEA1 monitors the dynamic event in the region to which the event server 210 is assigned (S2001) and determines whether the event is still occurring in the region (S2002). For example, the DEA eliminating section 1459 of DEA1 may monitor the contents of the dynamic event status storage 1451 to see whether any dynamic event content still remains or whether the severity of any remaining dynamic event content has fallen below a threshold. If the dynamic event is still occurring, the operational flow returns to step S2001. If not, it is further determined whether the local DEA (i.e. DEA1) is the source DEA (S2003). For example, the DEA eliminating section 1459 may determine whether the local DEA is the source DEA by consulting the local DEA information storage 1420, which stores information about the source DEA for each dynamic event agent of the subsystem 200. If it is determined that the local DEA is the source DEA at step S2003, the flow proceeds to step S2005. If it is determined that the local DEA is not the source DEA at step S2003, the flow proceeds to step S2004.

If it is determined that the local DEA is not the source DEA at step S2003, then DEA1, for example the eliminating section 1459, waits to receive a notification from the source DEA indicating that the event is no longer occurring in the region of the source DEA, or checks to see if such a notification has already been received (S2004). Once the notification has been received, DEA1 eliminates itself and sends a notification of the elimination of DEA1 to the source DEA (S2007). For example, the eliminating section 1459 may consult the local DEA information storage 1420 to determine the source DEA, send the notification to the source DEA via the communication section 1410 to be received by the eliminating section 1459 of the source DEA, delete the entry for DEA1 in the local DEA information storage 1420, and remove DEA1 completely from the event server 210 so that it can no longer be executed and does not use system resources.

If, on the other hand, it is determined that the local DEA is the source DEA at step S2003, it means that the local DEA (i.e. DEA1) is responsible for initiating the process of eliminating dynamic event agents associated with the dynamic event. In this case, DEA1 issues a notification to the event servers of all dynamic event agents in the DEA registry 1457 that the event is no longer occurring in the region of the source DEA (S2004). For example, the eliminating section 1459 may transmit the notification to all dynamic event agents in the DEA registry 1457 via the communication section 1410 to be received by the DEA eliminating sections 1459 of each dynamic event agent in the DEA registry 1457. Then, DEA1 waits until all dynamic event agents in the DEA registry 1457 have been eliminated (S2005). For example, the eliminating section 1459 may wait until it has received, from all dynamic event agents in the DEA registry 1457, notifications of the type transmitted by dynamic event agents that are not the source DEA in step S2004. Once it is determined that all dynamic event agents in the DEA registry 1457 have been eliminated, DEA1 eliminates itself (S2007). For example, the eliminating section 1459 may delete the entry for DEA1 in the local DEA information storage 1420 and remove DEA1 completely from the event server 210 so that it can no longer be executed and does not use system resources.

FIG. 21 shows example contents of the dynamic event status storage 1451 of a dynamic event agent, which stores dynamic event information about the dynamic event handled by the dynamic event agent. In the example of FIG. 21, the dynamic event handled by the dynamic event agent is a hurricane having a dynamic event ID of D0001. The dynamic event ID is an identifier for the dynamic event that is unique with respect to all existing dynamic events. Each of the remaining rows of the table represents an item of dynamic event content related to the dynamic event. The combination of Area ID, Edge ID, and Location columns indicates the geographic location of an item of dynamic event content within the region assigned to the subsystem 200 whose event server 210 executes the dynamic event agent, and the last column indicates the details of the dynamic event content at that geographic location. Dynamic event content in all areas of the region are included in the dynamic event status storage 1451.

FIG. 22 shows example contents of the local DEA information storage 1420 of an event server 210 executing a plurality of dynamic event agents (at least DEA1A, DEA2A, and DEA3A as shown in the Local DEA column). The DEA information storage 1420 acts as a record of all existing dynamic event agents within the subsystem 200 to which the event server 210 belongs, each represented by an entry in the Local DEA column. For each dynamic event agent, stored information may include, as shown, a dynamic event ID, an indication of the type of the dynamic event (e.g. hurricane, collision, fire, etc.), a timestamp indicating when the dynamic event agent was generated, a Local Status indicator (e.g. "active" or "ended"), which refers to the status of the dynamic event in the region, and a record of the Source DEA for the dynamic event along with its timestamp. For example, as can be understood from the table of FIG. 22, DEA1A is the source DEA for D0001, while DEA2A is not the source DEA for D0002. DEA2A may have been generated at the request of DEA2B or another dynamic event agent, or may have been generated on the basis of a dynamic event score calculated locally, initially presumed to be the source DEA, and then later demoted when the source DEA was re-determined.

Figure 23:
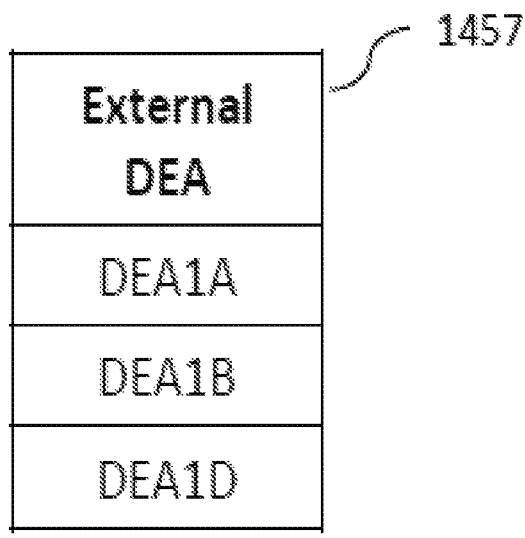
FIG. 23 shows example contents of the DEA registry 1457 of a dynamic event agent.

FIG. 23 shows example contents of the DEA registry 1457 of a dynamic event agent. The DEA registry 1457 shown in FIG. 23 contains three entries, DEA1A, DEA1B, and DEA1E, each representing an external dynamic event agent, that is, one that is executed by an event server 210 of a subsystem 200 assigned to a region different from the region of the dynamic event agent having the DEA registry 1457. The dynamic event agent whose DEA registry 1457 is shown in FIG. 23 may be, for example, DEA1C, in a subsystem 200 assigned to region C. The DEA registry 1457 need only be maintained by the source DEA and acts as a record of existing dynamic event agents for the same dynamic event.

Figure 24A:
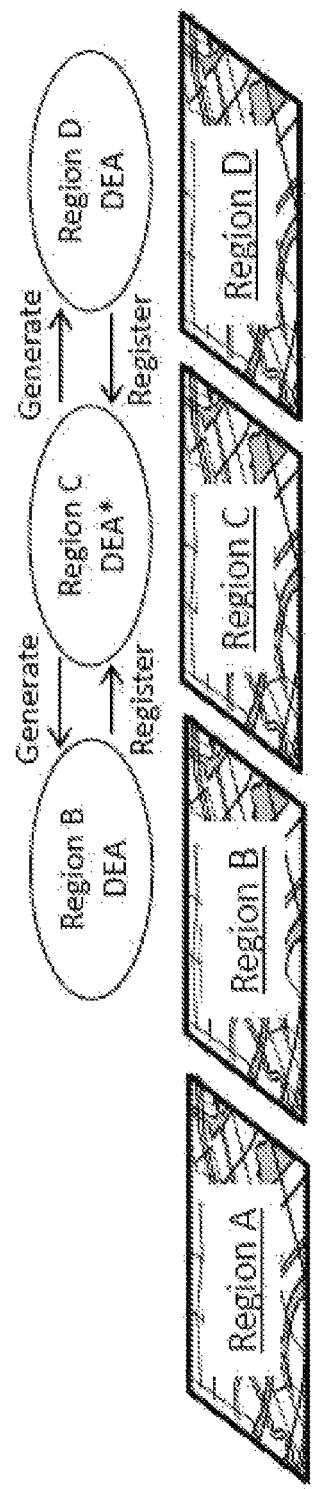
FIGS. 24A-C show a series of communications between and resulting states of dynamic event agents handling a dynamic event according to an embodiment of the present invention.
Figure 24B:
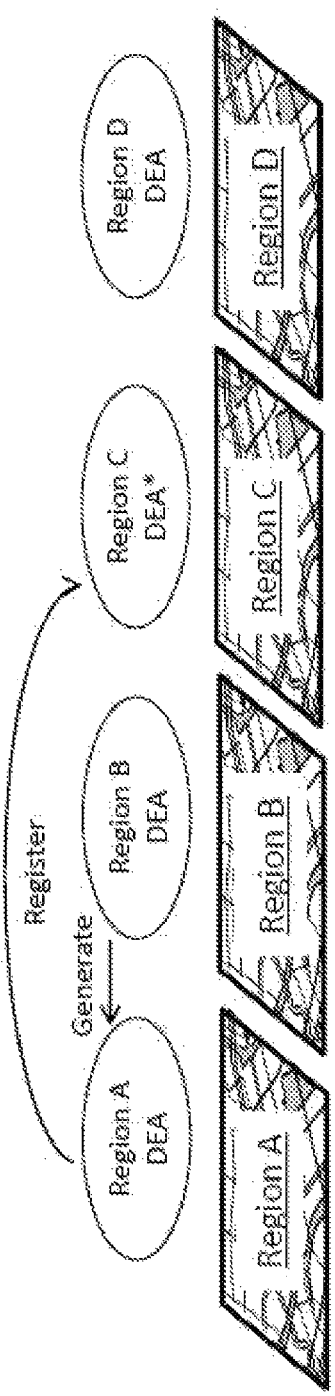
Figure 24C:
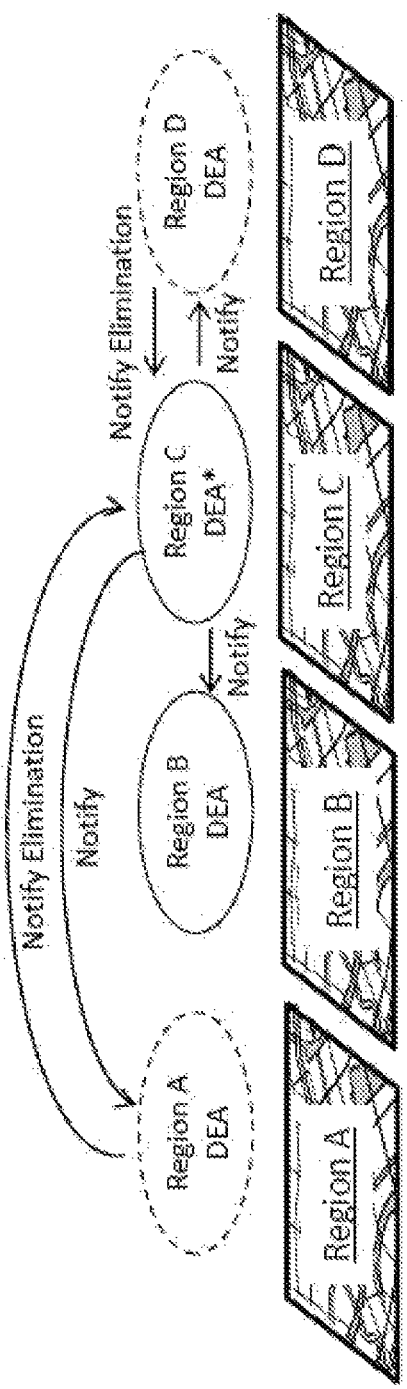

FIGS. 24A-C show a series of communications between and resulting states of dynamic event agents handling a dynamic event. Each of regions A-D is a geographic region handled by a different subsystem 200 of the system 100 shown in FIG. 1. Above some of the regions A-D is depicted a dynamic event agent (e.g. "Region B DEA"). Each of these dynamic event agents is executed by an event server 210 of the subsystem 200 assigned to the respective region, and the naming of the dynamic event agent reflects the region to which it is assigned. For example, "Region B DEA" refers to a dynamic event agent executed by an event server 210 of the subsystem 200 assigned to region B. Only a single dynamic event is described with respect to FIGS. 24A-C, with each of the depicted dynamic event agents handling the dynamic event within its respective region. "Region C DEA*" is indicated with an asterisk "*" to indicate that this dynamic event server is the source DEA for the dynamic event.

FIG. 24A illustrates a state after "Region C DEA*" has issued DEA generation requests to event servers 210 of the subsystems 200 assigned to regions B and D, as in step S1704 of FIG. 17. Since receiving the requests, event agents executed by the event servers 210 of regions B and D have generated "Region B DEA" and "Region D DEA," respectively, as in step S1803 of FIG. 18. The newly registered "Region B DEA" and "Region D DEA" have registered themselves with "Region C DEA*," which is the source DEA, as in step S1804 of FIG. 18. The information of "Region B DEA" and "Region D DEA" is stored in the DEA registry 1457 of "Region C DEA*."

FIG. 24B illustrates a state after the state shown in FIG. 24A and after "Region B DEA" has issued a DEA generation request to an event server 210 of the subsystem 200 assigned to region A, as in step S1704 of FIG. 17. Since receiving the request, an event agent executed by the event server 210 of region A has generated "Region A DEA" as in step S1803 of FIG. 18. The newly generated "Region A DEA" has registered itself with "Region C DEA*," which is the source DEA, as in step S1804 of FIG. 18. The information of "Region A DEA" is stored in the DEA registry 1457 of "Region C DEA*." In a state after the communications of FIGS. 24A and B, the DEA registry 1457 of "Region C DEA*" may look similar to the DEA registry 1457 shown in FIG. 23, with DEA1A, DEA1B, and DEA1D corresponding to "Region A DEA," "Region B DEA," and "Region D DEA." The registered information may be a DEA ID or address information unique to the specific dynamic event agent of the specific subsystem.

Lastly, FIG. 24C illustrates a state after the state shown in FIG. 24B, after the dynamic event has stopped occurring in regions A and D, and after "Region C DEA*" has issued notifications to the event servers of all dynamic event agents in the registry 1457 that the dynamic event is no longer occurring in region C, which is the region of the source DEA, as in step S2005 of FIG. 20. These notifications are depicted as "Notify" in FIG. 24C. After receiving the notification from "Region C DEA*," since the dynamic event has stopped occurring in regions A and D, "Region A DEA" and "Region D DEA" have eliminated themselves and notified "Region C DEA*," which is the source DEA, of their elimination, as in steps S2004 and S2007 of FIG. 20. The dashed ovals representing "Region A DEA" and "Region D DEA" signify that these dynamic event agents have been eliminated. Meanwhile, while "Region B DEA" has received the notification from "Region C DEA*," "Region B DEA" has not eliminated itself because the dynamic event is still occurring in region B. Therefore, "Region B DEA" will continue to monitor the dynamic event in region B as in steps S2001 and S2001 of FIG. 20. "Region C DEA*," the source DEA, is also not eliminated, even though the dynamic event has stopped occurring in region C. "Region C DEA*" will continue to wait until all dynamic event agents in the registry 1457 have been eliminated, as in step S2006 of FIG. 20, before eliminating itself.

Figure 25:
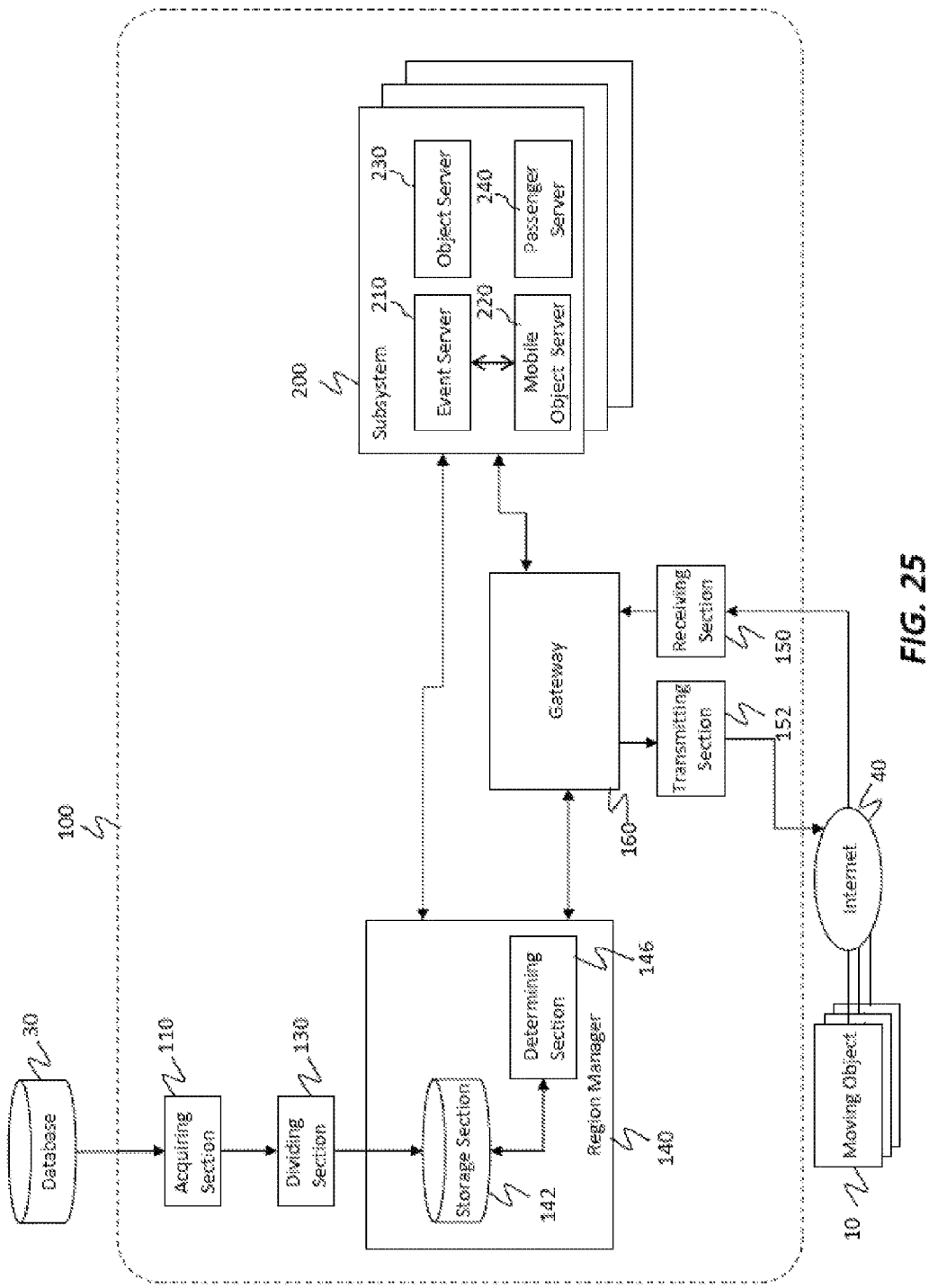
FIG. 25 shows a second exemplary configuration of the system 100 according to an embodiment of the present invention.

FIG. 25 shows an exemplary configuration of the system 100, according to an embodiment of the present invention. In this embodiment, each subsystem 200 includes an event server 210, mobile object server 220, an object server 230, and a passenger server 240. However, other embodiments are also possible, in which each subsystem 200 comprises any combination of singles or multiples of each server. In other embodiments, the system 100 may manage allocation of object agents of the object server 230 and passenger agents of the passenger server 240 in the subsystem 200. For example, the gateway apparatus 160 may change allocation of the object/passenger agents to the subsystems 200 to rectify the imbalance of data processing loads among the subsystems 200.

In the embodiment described above, the event server 210 may manage allocated event agents. In other embodiments, the system 100 may manage allocation of event agents to the event servers 210. For example, the gateway apparatus 160 may change allocation of event agents to the event servers 210 to rectify the imbalance of loads of processing events among the event servers 210. In the embodiment described above, the event server 210 causes each event agent to manage allocated divided area derived from a region. In other embodiment, the event server 210 causes at least one event agent to manage specific information regarding events (e.g., cross section of roads or other specific function(s) of a map, or, hurricane or other disaster/accident).

As can be understood from this disclosure, the embodiments of the present invention can be used to realize a system for managing geographic space and moving objects thereon. Moreover, the system can efficiently process large-scale events that affect a plurality of regions through the execution of dynamic event agents.

Figure 26:
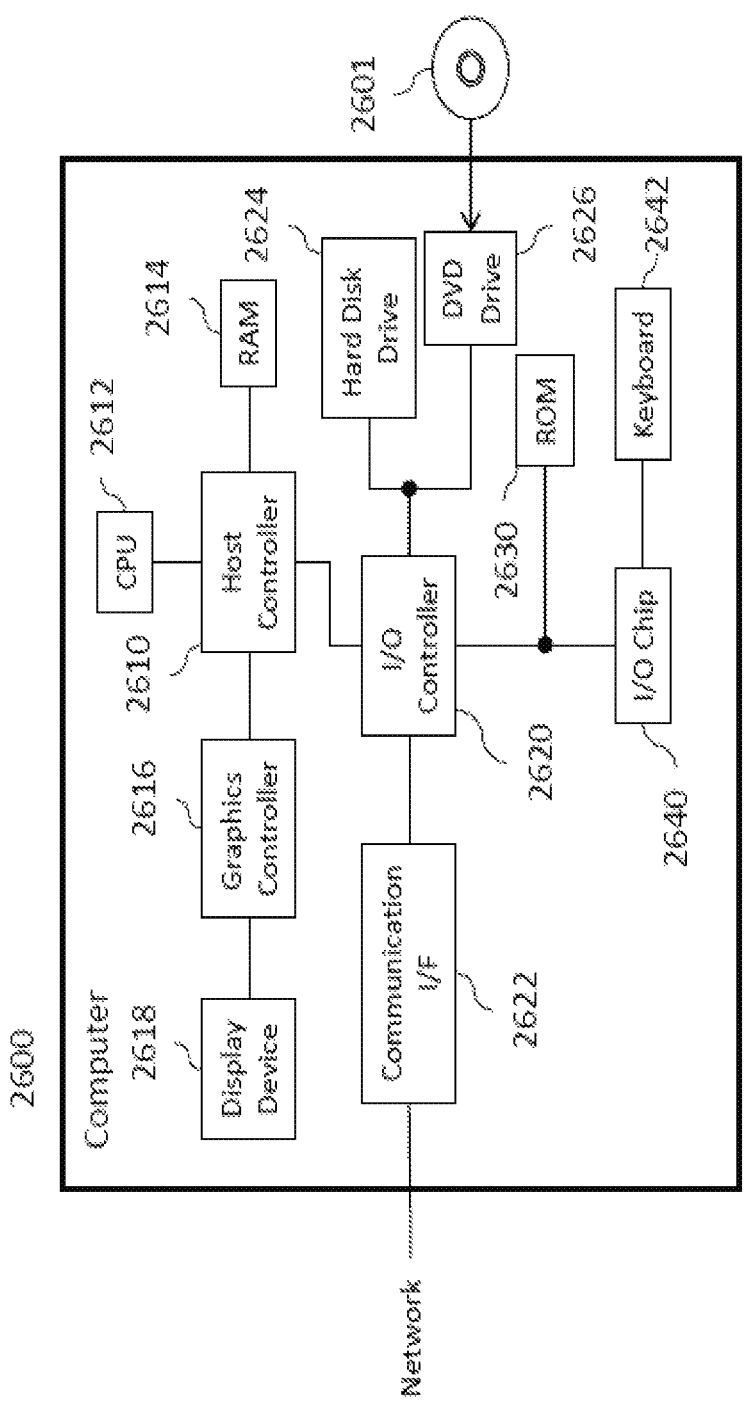
FIG. 26 shows an example of a computer 2600 in which the system 100 and the subsystem of FIG. 2, the operational flows of FIGS. 6-8, 13, and 15-20, and/or other embodiments of the claimed invention may be wholly or partly embodied.

FIG. 26 shows an example of a computer 2600 in which the system 100 and the operational flows of FIG. 2, the operational flows of FIGS. 6-8, 13, and 15-20, and/or other embodiments of the claimed invention may be wholly or partly embodied. The computer 2600 according to the present embodiment includes a CPU 2612, a RAM 2614, a graphics controller 2616, and a display device 2618, which are mutually connected by a host controller 2610. The computer 2600 also includes input/output units such as a communication interface 2622, a hard disk drive 2624, and a DVD-ROM drive 2626, which are connected to the host controller 2610 via an input/output controller 2620. The computer also includes legacy input/output units such as a ROM 2630 and a keyboard 1042, which is connected to the input/output controller 2620 through an input/output chip 1040.

The host controller 2610 connects the RAM 2614 with the CPU 2612 and the graphics controller 2616, which access the RAM 2614 at a high transfer rate. The CPU 2612 operates according to programs stored in the ROM 2630 and the RAM 2614, thereby controlling each unit. The graphics controller 2616 obtains image data generated by the CPU 2612 on a frame buffer or the like provided in the RAM 2614, and causes the image data to be displayed on the display device 2618. Alternatively, the graphics controller 2616 may contain therein a frame buffer or the like for storing image data generated by the CPU 2612.

The input/output controller 2620 connects the host controller 2610 with the communication interface 2622, the hard disk drive 2624, and the DVD-ROM drive 2626, which are relatively high-speed input/output units. The communication interface 2622 communicates with other electronic devices via a network. The hard disk drive 2624 stores programs and data used by the CPU 2612 within the computer 2600. The DVD-ROM drive 2626 reads the programs or the data from the DVD-ROM 2601, and provides the hard disk drive 2624 with the programs or the data via the RAM 2614.

The ROM 2630 and the keyboard 2642 and the input/output chip 2640, which are relatively low-speed input/output units, are connected to the input/output controller 2620. The ROM 2630 stores therein a boot program or the like executed by the computer 2600 at the time of activation, a program depending on the hardware of the computer 2600. The keyboard 2642 inputs text data or commands from a user, and may provide the hard disk drive 2624 with the text data or the commands via the RAM 2614. The input/output chip 2640 connects the keyboard 2642 to the input/output controller 2620, and may connect various input/output units via a parallel port, a serial port, a keyboard port, a mouse port, and the like to the input/output controller 2620.

A program to be stored on the hard disk drive 2624 via the RAM 2614 is provided by a recording medium such as the DVD-ROM 2601 or an IC card. The program is read from the recording medium, installed into the hard disk drive 2624 within the computer 2600 via the RAM 2614, and executed in the CPU 2612.

A program that is installed in the computer 2600 can cause the computer 2600 to function as a system or apparatus such as the system 100 of FIG. 1 or any of its components, such as the region manager 140 or any of the subsystems 200 or event servers 210 as shown, for example, in FIGS. 1, 3, 14, and 25. Such a program may act on the CPU 2612 to cause the computer 2600 to function as some or all of the sections, components, elements, databases, etc. of the system 100 (e.g., the DEA generating section 1442 of an event agent executed by the event server 210 as shown in FIG. 14, the DEA eliminating section 1459 of the dynamic event agent executed by the event server 210 as shown in FIG. 14, etc.).

A program that is installed in the computer 2600 can also cause the computer 2600 to perform an operational flow such as the operational flow of FIG. 6-8, 13, or 15-20. Such a program may act on the CPU 2612 to cause the computer 2600 to perform some or all of the steps of FIG. 6-8, 13, or 15-20 (e.g., generate source DEA as in S1504 of FIG. 15, eliminate local DEA as in S2007 of FIG. 20, etc.).

The information processing described in these programs is read into the computer 2600, resulting in the cooperation between a program and the above-mentioned various types of hardware resources. An apparatus or method may be constituted by realizing the operation or processing of information in accordance with the usage of the computer 2600.

For example, when communication is performed between the computer 2600 and an external device, the CPU 2612 may execute a communication program loaded onto the RAM 2614 to instruct communication processing to the communication interface 2622, based on the processing described in the communication program.

The communication interface 2622, under control of the CPU 2612, reads transmission data stored on a transmission buffering region provided in a recording medium such as the RAM 2614, the hard disk drive 2624, or the DVD-ROM 2601, and transmits the read transmission data to a network or writes reception data received from a network to a reception buffering region or the like provided on the recording medium. In this way, the communication interface 2622 may exchange transmission/reception data with a recording medium by a DMA (direct memory access) method or by a configuration in which the CPU 2612 reads the data from the recording medium or the communication interface 2622 of a transfer destination and writes the data into the communication interface 2622 or the recording medium of the transfer destination, so as to transfer the transmission/reception data.

In addition, the CPU 2612 may cause all or a necessary portion of a file or a database to be read into the RAM 2614 such as by DMA transfer, the file or the database having been stored in an external recording medium such as the hard disk drive 2624, the DVD-ROM drive 2626 (DVD-ROM 2601) and perform various types of processing on the data on the RAM 2614. The CPU 2612 may then write back the processed data to the external recording medium by means of a DMA transfer method or the like. In such processing, the RAM 2614 can be considered to temporarily store the contents of the external recording medium, and so the RAM 2614, the external recording apparatus, and the like are collectively referred to as a memory, a storage section, a recording medium, a computer readable medium, etc.

Various types of information, such as various types of programs, data, tables, and databases, may be stored in the recording apparatus to undergo information processing. Note that the CPU 2612 may also use a part of the RAM 2614 to perform reading/writing thereto on a cache memory. In such an embodiment, the cache is considered to be contained in the RAM 2614, the memory, and/or the recording medium unless noted otherwise, since the cache memory performs part of the function of the RAM 2614.

The CPU 2612 may perform various types of processing on the data read from the RAM 2614, which includes various types of operations, processing of information, condition judging, search/replace of information, etc., as described throughout this disclosure and designated by an instruction sequence of programs, and writes the result back to the RAM 2614. For example, when performing condition judging, the CPU 2612 may judge whether each type of variable is larger, smaller, no smaller than, no greater than, or equal to the other variable or constant, and when the condition judging results in the affirmative (or in the negative), the process branches to a different instruction sequence or calls a subroutine.

In addition, the CPU 2612 may search for information in a file, a database, etc., in the recording medium. For example, when a plurality of entries, each having an attribute value of a first attribute is associated with an attribute value of a second attribute, are stored in a recording apparatus, the CPU 2612 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD-ROM 2601, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1000 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A computer system for managing events in a plurality of geographic regions, the computer system comprising:
one or more processors, one or more computer-readable memories, one or more computer-readable tangible storage devices, and program instructions stored on at least one of the one or more storage devices for execution by at least one of the one or more processors via at least one of the one or more memories, the program instructions comprising
program instructions to manage, by a first subsystem, an event in a first region of the plurality of geographic regions using a first event agent;
program instructions to determine whether the event is predicted to spread from the first region to a second region of the plurality or geographic regions;
based on determining that the event is predicted to spread from the first region to the second region, program instructions to generate a first dynamic event agent to monitor the event as a dynamic event, wherein the first dynamic event agent comprises:
program instructions to receive information relating to the dynamic event;

program instructions to update a status of the dynamic event based on the received information; and program instructions to transmit the received information;

program instructions to generate, by a second subsystem, a second dynamic event agent for handling the dynamic event in the second region.

2. The system of claim 1, wherein determining that the event is predicted to leave the first region to the second region comprises program instructions to determine if a calculated probability that the second region will be affected by the dynamic event exceeds a threshold value.

3. The system of claim 1 further comprising
program instructions to transmit, by the second subsystem, a signal based on information about the dynamic event to a mobile object in the second region.

4. The system of claim 3, wherein generating the second dynamic event agent comprises:
receiving a signal based on generating the first dynamic event agent; and
based on receiving the signal, generating the second dynamic event agent for handling the dynamic event in the second region.

5. The system of claim 3, wherein the second event server is operable to register the second dynamic event agent with the first dynamic event agent.

6. The system of claim 3, further comprising:
program instructions to generate, by a third subsystem, a third dynamic event agent for handling the dynamic event in the third region based on receiving a request issued by the second dynamic event agent.

7. The system of claim 6, wherein the second dynamic event agent issues the request to the third subsystem if a calculated probability that the third region will be affected by the dynamic event exceeds a threshold value.

8. The system of claim 6, further comprising:
program instructions to register the third dynamic event agent with the first dynamic event agent; and
program instructions to transmit a signal based on information about the dynamic event to a mobile object in the third region.

9. The system of claim 3, further comprising:
program instructions to maintain, by the first subsystem, a registry of all dynamic event agents that have been generated for handling the dynamic event;
program instructions to issue, to all subsystems of the plurality of subsystems having a dynamic event agent in the registry, a notification that the dynamic event is no longer occurring in the first region; and
based on receiving the notification that the dynamic event is no longer occurring, program instructions to eliminate, by the second subsystem, the second dynamic event agent.

10. The system of claim 9, wherein the second dynamic event server eliminates the second dynamic event agent when the dynamic event is no longer occurring in the second region after receipt of the notification by the second subsystem.

11. The system of claim 10, wherein
program instructions to notify the first subsystem, by the second subsystem, when the second dynamic event agent is eliminated; and
program instructions to eliminate the first dynamic event agent when the dynamic event is no longer occurring in the first region and all dynamic event agents that were generated for handling the dynamic event have been eliminated.

12. The system of claim 1, wherein
program instructions for a second event agent, in the second subsystem, for handling events that occur in the second region; and
program instructions to receive, by the second dynamic event agent, information relating to an event from a mobile object in the second region, update a status of the second dynamic event based on the information if the received information relates to the second dynamic event, and forward the received information to the second event agent if the received information relates to an event other than the second dynamic event.

13. The system of claim 1, wherein the first event server is operable to generate the first dynamic event agent before occurrence of the dynamic event based on statistical information about occurrence of events in the first region.

14. The system of claim 1 further comprising:
program instructions to, by the first dynamic event agent, estimate traffic congestion of a vehicle route in the first region caused by the dynamic event; and
program instructions to transmit information about the estimated traffic congestion.

15. The system of claim 2 further comprising:
program instructions to estimate traffic congestion, by a first dynamic event agent, of a vehicle route in the first region caused by the dynamic event; and
program instructions to calculate, based on the estimated traffic congestion, the probability that the second region will be affected by the dynamic event.

16. The system of claim 1, wherein the dynamic event is a weather pattern, a fire, or a traffic condition.

17. A method comprising:
managing, by a first subsystem, an event in a first region of the plurality of geographic regions using a first event agent;
determining whether the event is predicted to spread from the first region to a second region of the plurality or geographic regions;
based on determining that the event is predicted spread from the first region to the second region, generating a first dynamic event agent to monitor the event as a dynamic event, wherein the first dynamic event agent comprises:
receiving information relating to the dynamic event;
updating a status of the dynamic event based on the received information; and
transmitting the received information;
generating, by a second subsystem, a second dynamic event agent for handling the dynamic event in the second region.

18. A computer program product including a non-transitory computer readable storage medium having program instructions stored therein, comprising:
program instructions to manage, by a first subsystem, an event in a first region of the plurality of geographic regions using a first event agent;
program instructions to determine whether the event is predicted to spread from the first region to a second region of the plurality or geographic regions;
based on determining that the event is predicted to spread from the first region to the second region, program instructions to generate a first dynamic event agent to monitor the event as a dynamic event, wherein the first dynamic event agent comprises:

program instructions to receive information relating to the dynamic event;
program instructions to update a status of the dynamic event based on the received information; and
program instructions to transmit the received information;
program instructions to generate, by a second subsystem, a second dynamic event agent for handling the dynamic event in the second region.

* * * * *